United States Patent
Howland

(10) Patent No.: US 10,448,680 B2
(45) Date of Patent: Oct. 22, 2019

(54) METHOD FOR FORMING INTERCONNECTIONS BETWEEN ELECTRONIC DEVICES EMBEDDED IN TEXTILE FIBERS

(71) Applicant: Warwick Mills Inc., New Ipswich, NH (US)

(72) Inventor: Charles A Howland, Temple, NH (US)

(73) Assignee: Warwick Mills, Inc., New Ipswich, NH (US)

( * ) Notice: Subject to any disclaimer, the term of this patent is extended or adjusted under 35 U.S.C. 154(b) by 0 days.

(21) Appl. No.: 15/756,113

(22) PCT Filed: May 12, 2017

(86) PCT No.: PCT/US2017/032348
§ 371 (c)(1),
(2) Date: Feb. 28, 2018

(87) PCT Pub. No.: WO2017/197228
PCT Pub. Date: Nov. 16, 2017

(65) Prior Publication Data
US 2019/0021407 A1 Jan. 24, 2019

Related U.S. Application Data

(60) Provisional application No. 62/335,773, filed on May 13, 2016, provisional application No. 62/374,061,
(Continued)

(51) Int. Cl.
*A41D 1/00* (2018.01)
*D03D 1/00* (2006.01)
(Continued)

(52) U.S. Cl.
CPC ............... *A41D 1/005* (2013.01); *A41D 1/00* (2013.01); *A41D 1/002* (2013.01); *A41H 42/00* (2013.01);
(Continued)

(58) Field of Classification Search
CPC ......... D03D 2700/0166; D03D 1/0088; A41D 1/002; A41D 1/005; A41H 42/00; A41H 43/02
See application file for complete search history.

(56) References Cited

U.S. PATENT DOCUMENTS 5,906,004 A  5/1999 Lebby
6,291,375 B1 * 9/2001 Allen ................. D03D 15/0005
442/308

(Continued)

FOREIGN PATENT DOCUMENTS

JP     2013079484 A   5/2013
KR  1020050008707 A   1/2005

OTHER PUBLICATIONS

International Search Report & Written Opinion for Appl No. PCT/US2017/032348 dated Nov. 13, 2018, 11 pages.
(Continued)

*Primary Examiner* — Peter Dungba Vo
*Assistant Examiner* — Jeffrey T Carley
(74) *Attorney, Agent, or Firm* — Maine Cernota & Rardin

(57) ABSTRACT

A method for forming interconnections between electronic devices embedded in a textile includes weaving a textile panel including at least one smart fiber having an electronic device embedded in a central portion thereof and at least one electrically conducting filament proximal to an outer boundary thereof. While the panel is in the weaving machine, fiducials not visible to the eye are created in the panel that are correlated in location with the smart fiber(s). After
(Continued)

removing the textile panel from the weaving machine, machine detection is used to locate the fiducials, thereby mapping distortions of the fiber pattern. An interconnect pattern is transformed to match the distorted fiber pattern of the conducting fibers, and is applied to the textile panel to form an electrical connection with the electronic device(s). The fiducials can include infra-red phosphors. Vias can be formed to provide electrical access to the conducting filament(s).

21 Claims, 32 Drawing Sheets

Related U.S. Application Data filed on Aug. 12, 2016, provisional application No. 62/400,857, filed on Sep. 28, 2016, provisional application No. 62/424,624, filed on Nov. 21, 2016, provisional application No. 62/423,239, filed on Nov. 17, 2016, provisional application No. 62/425,163, filed on Nov. 22, 2016.

(51) Int. Cl.
| | | |
|---|---|---|
| *A41H 42/00* | (2006.01) | |
| *A41H 43/02* | (2006.01) | |
| *G06F 1/16* | (2006.01) | |
| *H04W 4/00* | (2018.01) | |

(52) U.S. Cl.
CPC ........... *A41H 43/02* (2013.01); *D03D 1/0088* (2013.01); *G06F 1/163* (2013.01); *G06F 1/169* (2013.01); *G06F 1/1637* (2013.01); *H04W 4/00* (2013.01); *D03D 2700/0166* (2013.01)

(56) References Cited

U.S. PATENT DOCUMENTS

| | | | |
|---|---|---|---|
| 6,381,482 B1* | 4/2002 | Jayaraman | A61B 5/6805 |
| | | | 600/388 |
| 6,854,988 B2* | 2/2005 | Marmaropoulos | A41D 1/005 |
| | | | 2/69 |
| 7,299,964 B2* | 11/2007 | Jayaraman | H01R 43/0207 |
| | | | 228/110.1 |
| 10,065,074 B1* | 9/2018 | Hoang | A63B 24/0003 |
| 2010/0147562 A1* | 6/2010 | Chu | B32B 5/26 |
| | | | 174/254 |
| 2011/0036448 A1 | 2/2011 | Van Pieterson | |
| 2014/0277683 A1 | 9/2014 | Gupta | |
| 2018/0087193 A1* | 3/2018 | Fu | D04B 1/26 |
| 2018/0363172 A1* | 12/2018 | Keating | D01F 1/10 |

OTHER PUBLICATIONS

PCT Search Reportand Written Opinion of PCT Application No. PCT/US2017/032348, dated Nov. 1, 2017, 15 pages.

* cited by examiner

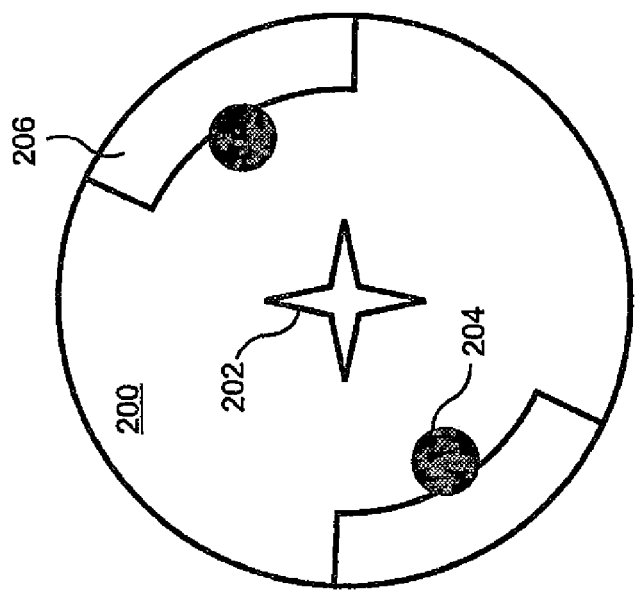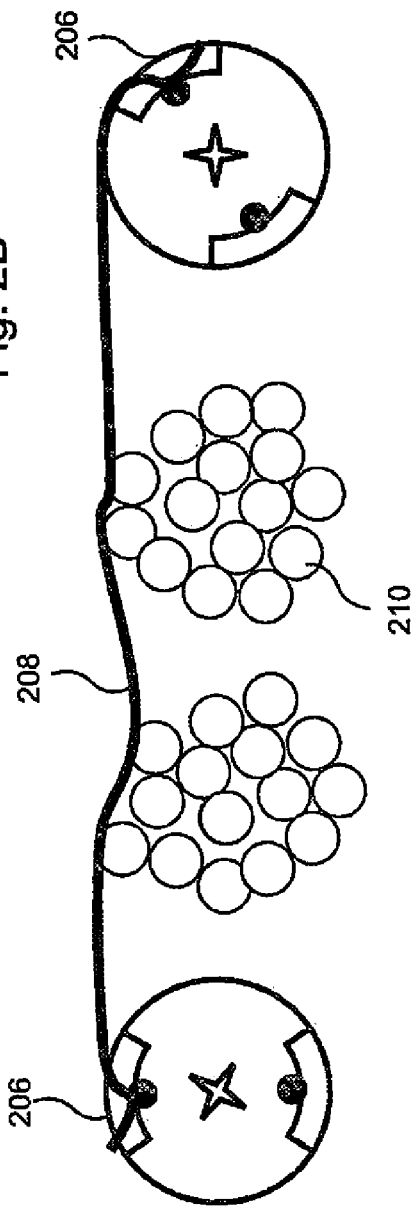

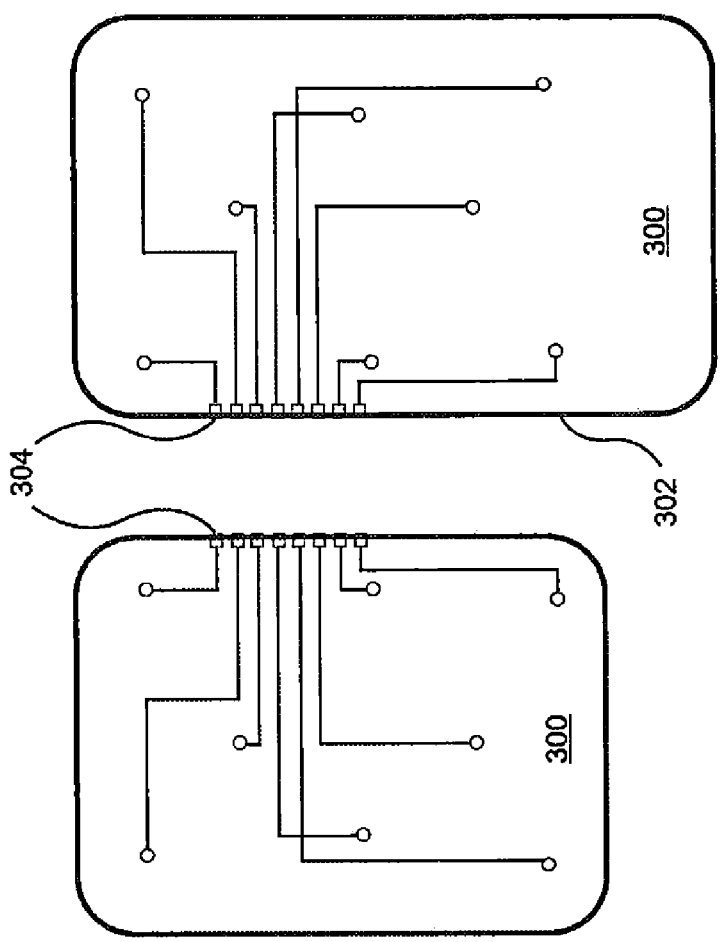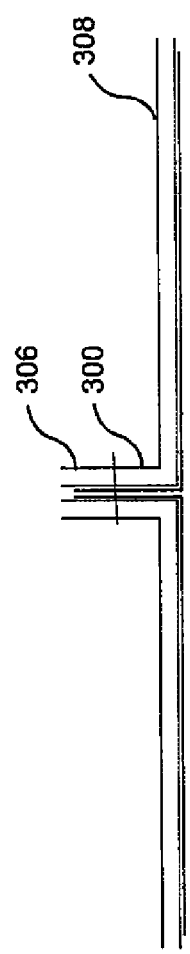

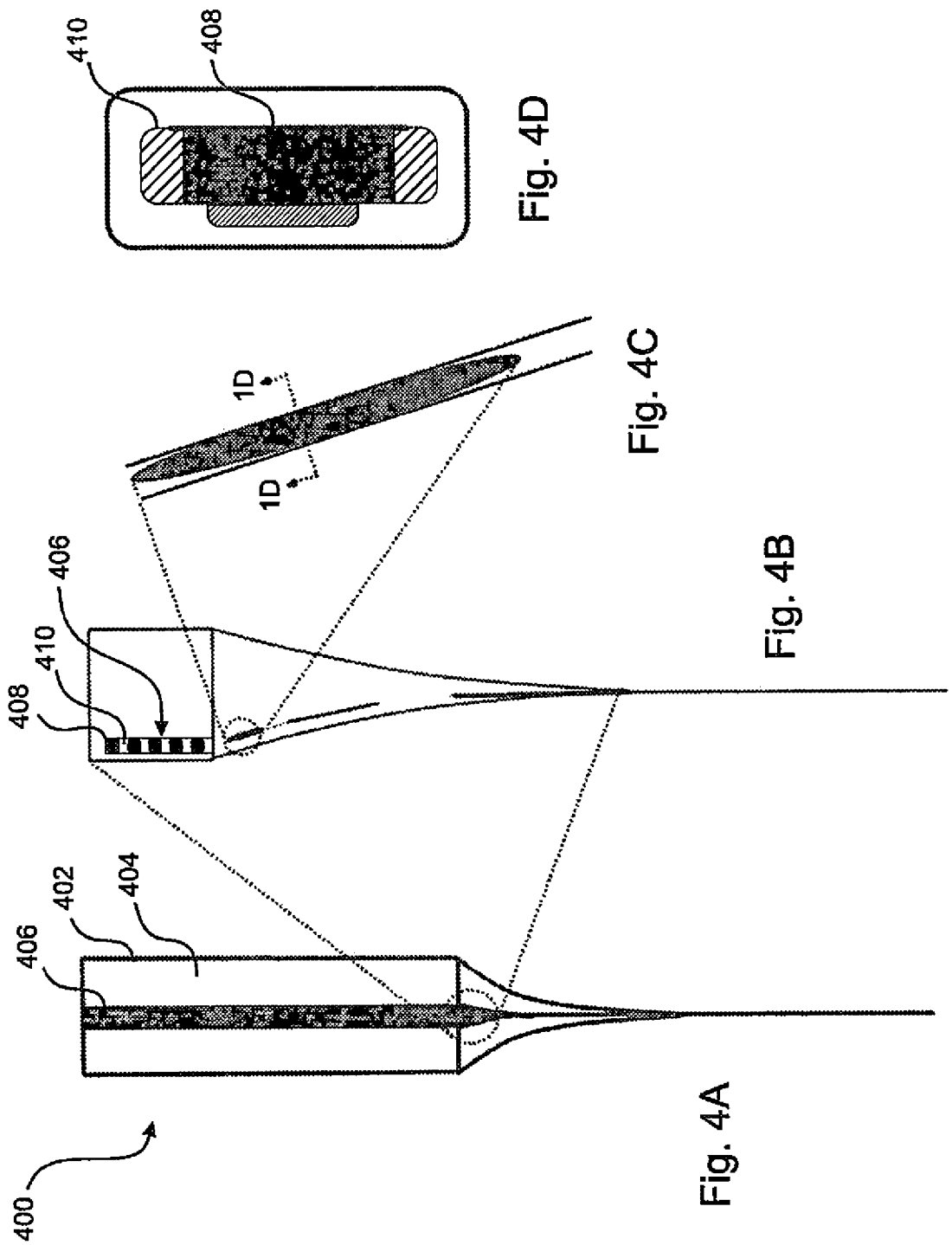

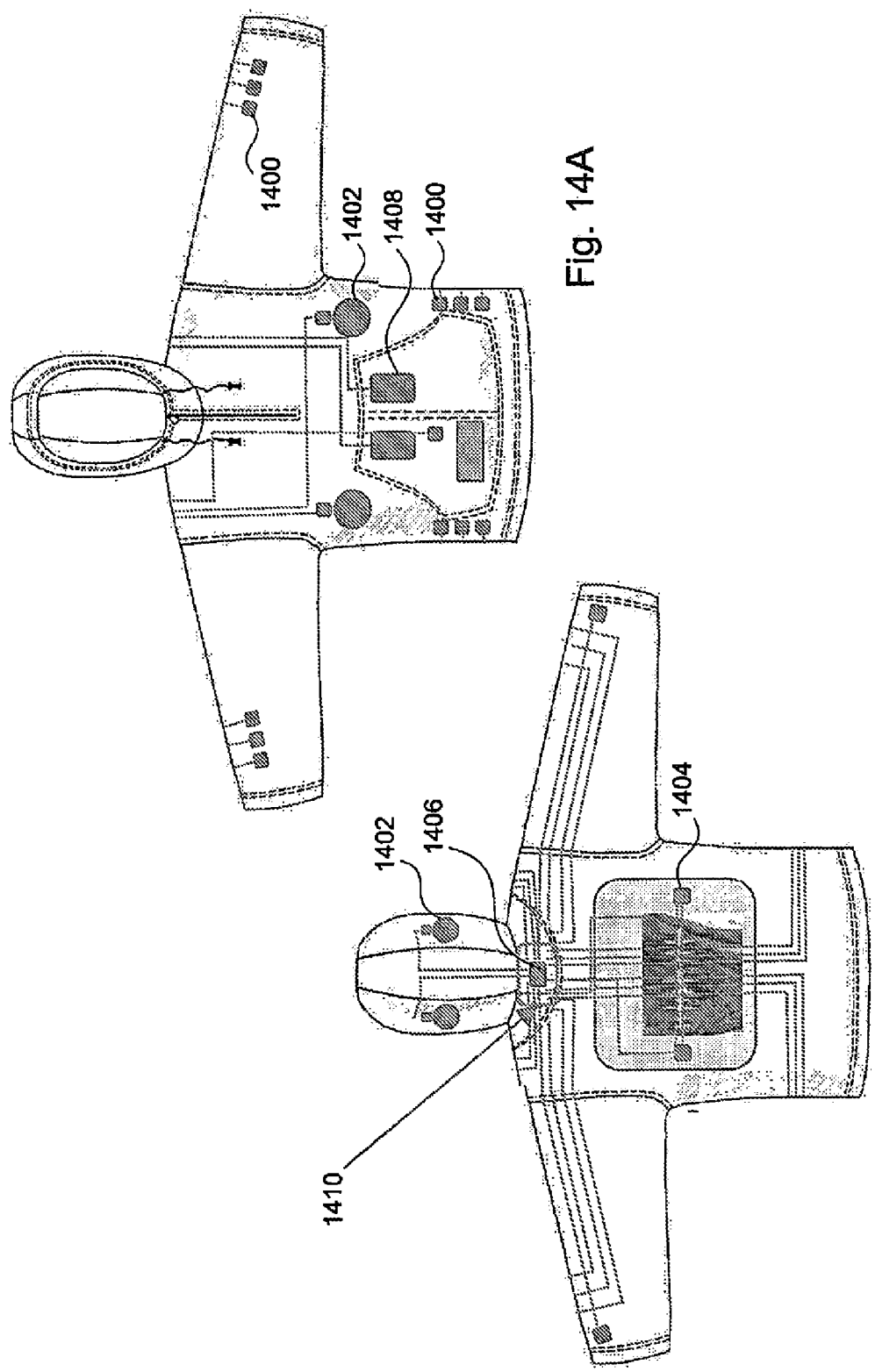

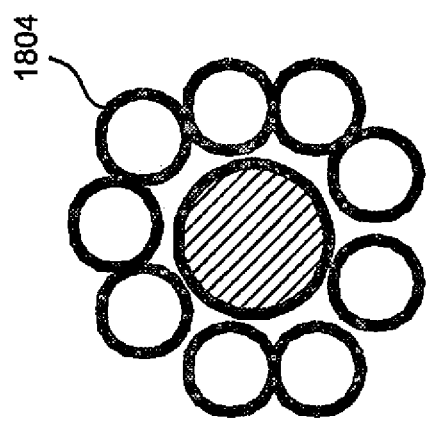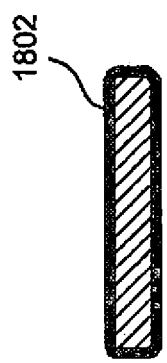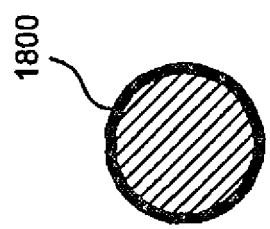
Fig. 18

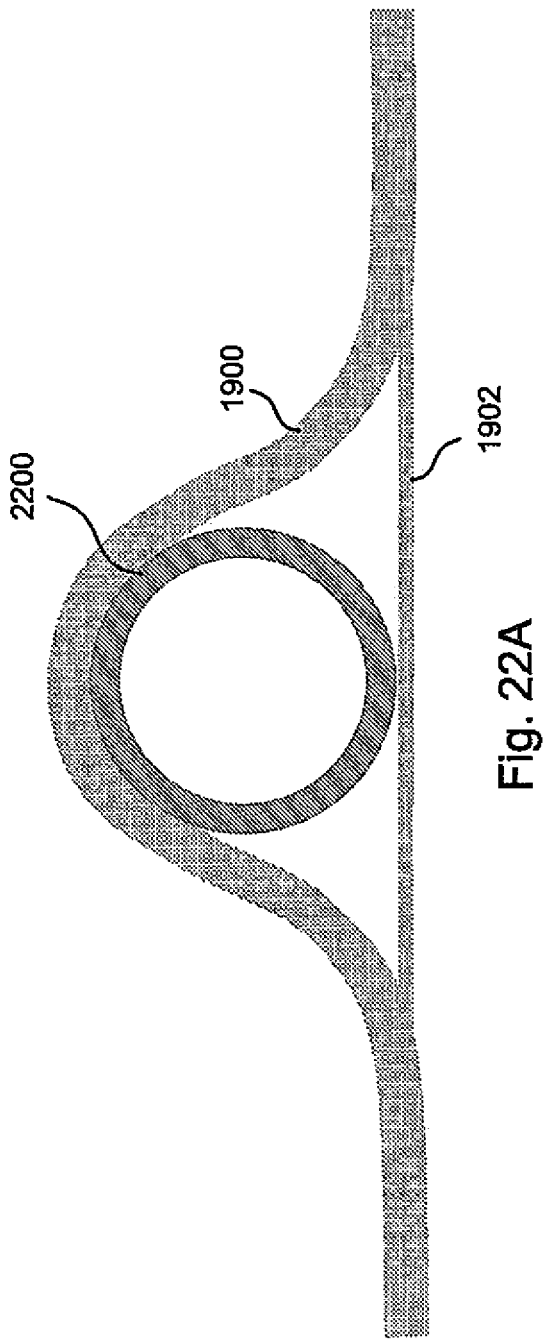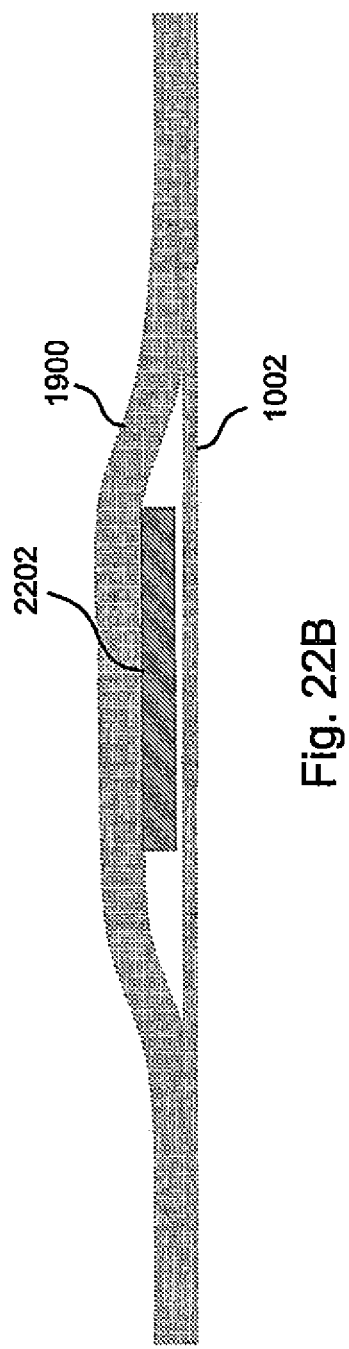

| Polymer tape assemblies | Fabric tape over polymer assemblies |
Straight conductor tapes
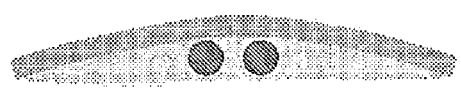
Crimped or Zig-zag conductor stretch tapes
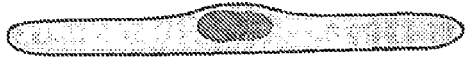
Fig. 26

METHOD FOR FORMING INTERCONNECTIONS BETWEEN ELECTRONIC DEVICES EMBEDDED IN TEXTILE FIBERS

RELATED APPLICATIONS

This application claims the benefit of U.S. Provisional Applications No. 62/335,773, filed May 13, 2016; No. 62/374,061, filed Aug. 12, 2016; No. 62/400,857, filed Sep. 28, 2016; No. 62/424,624, filed Nov. 21, 2016; No. 62/423,239, filed Nov. 17, 2016; and No. 62/425,163, filed Nov. 22, 2016. Each of these applications is herein incorporated by reference in their entirety for all purposes.

FIELD OF THE INVENTION

The invention relates to nanotechnology, embedded wearable electronic devices, fabrics and garments having integrated electronic features, and audiovisual performances. The invention relates more particularly to nanotechnology encapsulated in fibers, interconnections between devices embedded in textile fibers, systems for attaching electronic devices to fabrics having conductors integrated therewith, and systems for creating and controlling audiovisual performances.

BACKGROUND OF THE INVENTION

Over the past decades, so-called "smart" devices have transitioned from being mainly a fixed technology (for example "main frame" computers and desktop computers), to being portable (for example laptop computers) and even wearable (for example PDA's and "smart" cellular telephones). Currently, advances are being made in so-called "embedded" wearable technology, whereby "smart" technology need not be located in separately worn devices, but instead can be integrated into clothing and other commonly worn accessories such as watches and eyeglasses.

The miniaturization of electronic devices has been enabled, among other advances, by improved methods for interconnecting electronic components. In particular, circuits which were once wired by hand have been replaced by so-called "printed" circuits, where complex interconnections are provided between surface-mounted devices by conducting paths that are printed onto a rigid, multi-layer substrate, or "circuit board."

Due to the complexity of typical electronic circuits, interconnecting features that are commonly required in contemporary circuit board designs include:
  signal layers;
  power layers;
  ground layers;
  vias;
  bonded interconnect pads;
  separable connectors; and
  thermal management for high power devices.

The availability of active and conductive fibers is an important step toward integrating electronic systems into fibers that are included in fabrics, whereby active devices are not sitting on a surface mount solder pad, but instead are embedded within the fibers of a garment or other textile article. However, current textile production methods cannot provide the complex interconnections that are required for creating multi-component circuits using such fiber-embedded devices.

It is clear that the preform processes by which active devices are produced will evolve over time, and it is reasonable to expect that such devices will take on a more continuous character. This will provide an enhanced capability to distribute the devices within textile fibers. However, improved approaches are needed for creating a continuous capability for intercommunication between the fiber-embedded devices of a textile-embedded circuit, and for interconnecting the devices between textile panels and with exterior devices and power sources.

Polymeric fibers have become ubiquitous in applications such as textile fabrics, due to their excellent mechanical properties and availability of low-cost, high-volume processing techniques. In particular, many polymer fibers and films can be formed by "drawing" or otherwise elongating relatively macroscopic preforms so as to create much thinner, elongated versions thereof. In some cases, a preform having a plurality of active components assembled in a desired structure can be drawn or otherwise elongated so as to dramatically reduce at least one dimension of the preform, and thereby reduce the structure and configuration of the active components to a micro-scale or nanoscale. Accordingly, drawing of structured, multi-component polymeric preforms can provide a cost-effective method for producing fibers, films, and other polymeric constructs having microstructurers and/or nanostructures incorporated therein.

An example of this approach is disclosed in U.S. Pat. No. 7,311,962, incorporated herein by reference in its entirety for all purposes. U.S. Pat. No. 7,311,962 discloses the creation of electromagnetic waveguides, fiber optics, and other optically active structures incorporating dielectric mirrors by applying a coating of a chalcogenide glass to a thermoplastic polymer film, creating a preform by rolling the film about a core, for example a poly(ether-sulfone) ("PES") core, and then drawing the preform at an elevated temperature to create a fiber comprising a core surrounded by a plurality of layers of continuous, alternating, closely spaced glass and polymer layers. By appropriate selection of the dielectric constants of the glass and polymer, and of the layer spacing, the layers can be configured so as to almost perfectly reflect electromagnetic waves at desired wavelengths.

Because it is necessary for active, multi-component fibers to contain materials that are designed to provide electrical, optical, and/or sensor functions, such fibers must of necessity contain materials that are not normally used in fibers. Often, these active component materials do not have properties consistent with bending, abrasion and/or other textile requirements. For example, the fibers disclosed by U.S. Pat. No. 7,311,962 can be configured with a variety of desirable properties, such conduction of light, as well as absorption and/or reflection of incident electromagnetic radiation within selected wavelength bands. However, practical applications of the disclosed fibers are limited, because the glass layers tend to fracture and disintegrate when the fibers are bent.

This inability of active, multi-component fibers to bend freely precludes many applications of interest, such as incorporation into wearable garments for the purpose of inhibiting IR vision detection by blocking infra-red emissions, or of facilitating identification of friendly forces by emitting or reflecting easily identified patterns when irradiated by specifically chosen wavelengths of light. The approach of U.S. Pat. No. 7,311,962 is also limited to continuous active elements, i.e. continuous layers of polymer and glass films, and is not easily extended to applications that would require, for example, a plurality of discrete, spaced-apart, interconnected sensors encapsulated within a fiber.

E-fabrics, also sometimes referred to as e-textiles, smart garments, smart clothing, electronic textiles, smart textiles, and smart fabrics, are fabrics (or garments or other items made from fabrics) that enable the digital components of an electronic system to be attached to the fabric or even embedded within the fabric, such that the interconnections between the components are provided by conductors that are integral with the fabric. Such fabrics and the articles made from them have the ability to do many things that traditional fabrics cannot, including communicate, transform, and conduct energy.

Smart textiles can be aesthetic and/or performance enhancing. For example, various smart fabrics can light up and/or can change color. Performance enhancing smart textiles have applications in athletics, extreme sports, and military applications. These include fabrics designed to regulate body temperature, reduce wind resistance, and control muscle vibration. Other smart fabrics have been developed for protective clothing, to guard against extreme environmental hazards such as radiation and the effects of space travel. The health and beauty industry is also taking advantage of these innovations to provide, for example, drug-releasing medical textiles, and many designs for wearable technology and wearable computing systems depend upon interconnections provided by e-textiles. In addition to wearable applications, e-textiles also have application in other fields such as interior design.

With reference to FIG. 1, conducting inks can be printed 100 onto one or both sides of the fabric using either 2D or 3D printing, or stitched onto the fabric using applique stitching 102. Conductors can also be woven into the fabric itself as fibers in either or both of the warp and fill directions. As the complexity of the fabric circuitry increases, it can becomes necessary to direct conductors in a plurality of paths on or within the fabric that cross over each other, for example by printing conductors on both sides of a fabric, or by weaving insulated wires as fibers in both the warp and fill directions. Furthermore, a fabric with more than two "levels" (i.e. planes) of fibers can be provided by including a plurality of plies in the fabric 104. An e-fabric panel or garment can include interconnections between these integral conductors and/or connection pads that provide connectivity between the integral conductors and external devices.

Of course, it is not sufficient merely to incorporate conductors onto or into a fabric. It is also necessary to provide connection points or "pads" for connecting the conductors with embedded and/or attached devices. And in more sophisticated designs, it can be necessary to provide vias that form bridging connections between conductors that cross over each other in the fabric.

General considerations that typically apply to conductors in e-fabrics include:
- conductors must operate across textile seams;
- conductors must provide connections on both sides of the fabric;
- conductors must connect to devices such as active buttons and multi-component fibers;
- conductors included in stretch fabrics must be able to stretch;
- textile bias stretch can put conductors into shear;
- the potential for copper conductors to become work-hardened must be controlled;
- printed conductors have to be wash fast and durable; and
- the conductors and the method of manufacture must be low in cost.

Embodiments that include printed conductors 100 must use conductive inks that are fully wash fast. Some include cover coats and/or binders. If a conductive ink that includes a noble metal filler is used, printers having microelectromechanical systems ("MEMS") print head configurations cannot be used because of the large sizes of the noble metal particles. These include various digital printers, screen printers, and some specialized digital printers.

Most graphene-based inks are compatible with digital printing using MEMS print heads. However, some binders used in graphene ink designs create thermal challenges (250 C, 480 F).

When printed conductors are applied on cut panels of fabrics, registration to the textile is not required. However, it is typically necessary to include fabric vias so as to provide pads or contacts on opposing sides of the textile. In addition, seam vias are often required, as well as connection pads and/or contact pads.

E-fabrics that include woven conductors require extensive design interaction, from woven patterning to garment patterning. Among the various e-fabric conductor approaches, woven conductors are generally the least visible. However, woven conductors are typically not compatible with knit fabrics.

Typically, woven conductors are incorporated into fabrics as roll goods, thereby requiring that cut panels be registered to woven patterns so as to align the woven conductors to the cut patterns. Also, a second production step is typically required so as to provide vias between warp and fill conductors, including vias provided in the seams.

While the requirements to provide connection pads and vias are somewhat analogous to vias and connection pads in conventional printed circuit boards, they give rise to several problems that do not apply to traditional printed circuit boards, due to the flexibility of the fabric, the necessity of including seams in the fabric, and the necessity of exposing the fabric to conventional washing procedures.

While it is sometimes possible to integrate electronic devices within an e-fabric, many devices are too large to be incorporated into a fabric, and many devices are incompatible or only semi-compatible with washing procedures that are applicable to a fabric. For example, such devices may be compatible with water, but not with the wetting agents and detergents used in washing. They may be compatible with the heat and moisture used in drying, but not with the tumbling actions of a dryer. Accordingly, it is often desirable or necessary to removably attach electronic devices to surfaces of an e-fabric as "external" devices that communicate with each other through the conductors provided by the e-fabric. This approach also has the advantage of making it easier to service and upgrade the attached devices without any need to modify the underlying e-fabric.

Metal snaps are a well-known approach for providing electrical connectivity between conductors of an e-fabric and an external device. While snaps are typically rigid or semi-rigid, they are small in size, so that this approach works well when it is necessary to make only a few connections, typically from 2-4 connections. When more connections are needed, another approach is to use multi-contact connectors instead of simple snaps. Examples are given in U.S. Pat. Nos. 3,991,563, 6,563,424, and 7,462,035, all of which are incorporated herein in their entirety for all purposes.

However, as the required number of connections becomes even larger, rigid snaps and rigid multi-contact connectors become unsatisfactory, because the inclusion of large, rigid connectors and/or a large number of smaller rigid connectors can unduly impair the flexibility of the underlying fabric.

Throughout history, various approaches have been implemented in attempts to generate and control complex musical effects in live music concerts. Examples include a symphony orchestra, in which many instruments capable of producing a variety of different sounds are brought together to be played by a group of separate musicians under the unifying control of a director. However, this approach has the disadvantage of requiring the coordinated action of a large number of people. Perhaps the most successful historical approach for creating complex musical effects that are controlled by a single individual is the concert organ, having many ranks of pipes controlled by a plurality of keyboards and pedal sets.

While the desire to combine and control a large number of varied sounds in a complex manner has been longstanding, both the variety of possible acoustic effects and the range of possibilities for controlling them has increased exponentially in recent times as music has transitioned from traditional analog devices (i.e. acoustic musical instruments) to digitally recorded and/or generated compositions. The computing power and speed of devices that can control digital media has increased dramatically, and continues to do so. As a result, a modern live musical concert may present a complex mixture of various effects, including music generated by live musicians, pre-recorded music, delayed playback of live music, live mashups of pre-recorded musical tracks, and/or music that is generated by software in an entirely digital manner.

Furthermore, live concerts often go beyond sound and also include visual presentations, such as lighting effects and even pyrotechnics. Accordingly, it is more accurate to refer to such live concerts as being audiovisual, where the term is used herein to refer to any live presentation that is flexibly controlled in real time and that includes any combination of audio and/or visual presentation.

Controlling a complex array of audiovisual aspects in real time can be a significant challenge for the presenters of a modern musical performance. While the capabilities of digital media devices and digital control systems has increased dramatically, human beings continue to have only two hands and two feet that can be used for controlling audiovisual systems in real time. Of course, some or all aspects of a performance could be pre-determined and pre-programmed, but doing so would diminish or eliminate the spontaneous creativity and audience interaction that are unique and highly desirable features of live performances.

Accordingly, a live audiovisual presentation often requires a cooperative effort by a staff of technicians to operate and control all of the devices used in the performance, thereby reducing the degree to which a solo or "star" performer maintains creative and spontaneous control over the performance. Also, the cost and logistical demands involved in gathering a staff and acquiring and fielding a complex control system tends to restrict the creation and spontaneous control of complex audiovisual presentations to large scale events, thereby excluding most musicians from enjoying and experimenting with real-time control over the full range of live audiovisual effects that devices and systems of relatively modest costs could otherwise produce. In other words, it is often the lack of any means to control audiovisual systems in real time, and not the cost and availability of the audiovisual devices themselves, that limits access of artists to creative audiovisual effects.

One approach that has been tried is the use of a band that can be attached to a user's arm in direct contact with the skin, whereby the band is able to sense muscle activity of the user's forearm. This bio-sensing approach has the advantage of allowing the user to use parts of the body other than the hands and feet to control aspects of an audiovisual presentation system. However, bio-sensing requires direct and firm skin contact of the sensors, which can be uncomfortable and cumbersome for the user. Also, it can be problematic to combine this approach with conventional hand manipulation of buttons, sliders, and other controls, because most of the muscles that control the hand and fingers are located in the forearm.

What is needed, therefore, are techniques for registering textiles for forming interconnections, cutting vias into fibers with active components, and forming interconnections between textile panels and with exterior devices. Furthermore, for some applications there is also a need to provide these interconnectivity features while at the same time maintaining or enhancing an esthetic appearance of the fabric.

What is also needed is a highly flexible drawn fiber having continuous and/or discrete active elements encapsulated therein. What is also needed are techniques for connecting e-fabric conductors with internal and external devices, and for providing vias that interconnect conductors that cross each other within the fabric.

What is also needed is a flexible system for forming large numbers of electrical interconnections between an external device and the conductors of an e-fabric, while not unduly impairing the flexibility of the underlying fabric.

What is also needed are e-fabrics, including stretchable e-fabrics, having conductors that can be economically applied to fabric panels and garments, including across the seams thereof, without concern for registration between the conductors and the underlying fabric, and without concern for registration between panels of a garment or other multi-panel fabric assembly.

And what is also needed is a control system that enables a single user to control a large number of aspects of a digital audiovisual presentation in real time, without requiring direct skin contact by sensors or direct sensing of the users muscle activity.

SUMMARY OF THE INVENTION

In a first general aspect of the present disclosure, methods are disclosed for providing textile registration for interconnecting active electronic devices embedded within "smart" textile fibers, for cutting vias into the smart fibers, and for forming electronic interconnections between textile panels. In embodiments, these features are provided while at the same time maintaining an esthetic fabric appearance.

The disclosed methods employ new materials, coatings, and etching processes. The disclosed manufacturing approaches includes methods for the manufacture of smart, uniform fabric systems using advanced textile digital printing, and material deposition using modern line-scan inkjet processes.

Interconnections are formed between electronic devices embedded in a "smart" fibers included in a textile panel. A plurality of non-visible fiducials that correspond with the smart fibers are created in the panel during its manufacture on a weaving machine. After removal from the weaving machine, machine vision locates the fiducials and maps distortions of the smart fiber pattern. An interconnect pattern is transformed according to the mapped distortions and applied to the panel to form connections between smart fibers and to connection pads. Vias can be formed on the smart fibers by chemical and/or laser etching. The interconnecting paths can be applied by ink jet printing of conducting inks, and can be extended to connection pads on an edge of the panel, which can be adhered by a conducting adhesive to pads on an adjoining panel before sewing together the edges to form an electrically interconnecting seam.

In a second general aspect of the present disclosure, a highly flexible drawn fiber is disclosed having continuous and/or discrete active elements encapsulated therein. The highly bendable drawn fiber is suitable for incorporation in fabrics includes continuous and/or discrete active elements encapsulated in a flexible matrix. In embodiments, the fiber is between 50 and 400 microns in diameter. Bending stresses in both compression and tension are limited by encapsulating the discrete and/or continuous active elements within a highly flexible, amorphous, low modulus polymer or elastomer surrounded by an outer sheath of relatively more rigid, oriented polymer. In embodiments, continuous active elements surrounding the central axis of the fiber are longitudinally segmented. Discrete elements can be thermoplastic or rigid, and can be interconnected by pairing with continuous elements.

General Description of Fiber Bending

For conventional, multi-filament yarns the individual filament diameters typically range from between 10 microns and 40 microns. The vast majority of the fibers used are single component fibers, although there is some production of filaments used for bonding of nonwovens with lower belt sheath polymers that include a core surrounded by a sheath.

These small filament sizes (10 to 40 microns) represent an effective upper limit for yarns made of more problematic materials such as glass, carbon, para-aramid, LCP, PET, and UHMWPE. Fibers belonging to this class of high-strength materials have matching high modulus and crystallinity. Some of these materials can be shown to have borderline performance in bending by flex fold testing.

In flex fold testing, a fabric is folded and a crease is formed at an agreed radius. The radius can be controlled by the use of space shims placed between the two faces of the folded sample. An agreed load with a defined compliance is used to close the crease. A typical set of conditions is designed to simulate stepping on the fabric crease with a rubber soled shoe.

Pressure 25 psi
Shim thickness 0
Compliance shore A 70 rubber, ⅜ thick
Back side no compliance (simulate hard flooring)

The results of a flex fold test are measured by running of the samples in ASTM ravel strip tensile and reporting un-folded tensile as a percentage of retained tensile after folding. Even at small filament diameters of 10-40 microns, glass and para-aramid show 20-80% tensile loss in flex fold simulations of a crease stepped on by an adult male.

In contrast, the multicomponent filaments in embodiments of this invention are much larger in diameter, ranging from 50 to 400 microns in diameter. These large diameters are required in various embodiments so as to accommodate the active components in the filament, and they also arise in some embodiments due to limitations of the draw process.

The large filaments diameters in embodiments of the present invention result in much higher stresses in both compression and tension when these filaments are subject to bending. The present invention overcomes these limitations by encapsulating the active elements within a highly flexible, amorphous, low modulus polymer or amorphous elastomer surrounded by an outer sheath of relatively more rigid, oriented polymer. It should be noted that before the present invention, multi-component fibers having an amorphous, low modulus polymeric or elastomeric core surrounded by a more conventional, oriented polymeric sheath were virtually unknown in the art.

Embodiments of the present invention further improve the bendability of active, multi-component fibers that include continuous active components by longitudinally segmenting the continuous components, such that they are configured as a plurality of longitudinal strips arranged about the central axis of the fiber, rather than as an unbroken cylinder or spiral.

In a third general aspect of the present disclosure, E-fabrics are disclosed which include vias that form interconnections between conductors included on or in the fabric, and/or between connection pads on a surface of the fabric and a conductor included in or on the fabric, as well as techniques for forming such vias. In embodiments, the conductors are included in the fabric by printing, sewing, adhesive bonding, applique, or weaving. The vias and/or connection pads are formed by injecting a conductive matrix material into the fabric, such that it bridges across at least two overlapping conductors and/or between a conductor and a connection pad. The conductive matrix material can include metallic and/or graphene materials, or can be a conductive polymer. Fibers in the fabric can be pre-treated with an electroless plating primer for enhanced bonding with a metallic matrix material.

In embodiments, the disclosed E-fabrics include connections to internal devices, connection pads for connecting with external devices, and/or vias that form interconnections between conductors that cross each other on or within the fabric, as well as techniques for forming such connections.

In embodiments, the conductors are included in the fabric by printing, sewing, adhesive bonding, applique, or weaving. The vias and/or connection pads are formed by injecting a conductive matrix material into the fabric such that it bridges between a connection pad and a conductor, and/or across at least two overlapping conductors. The conductive matrix material can include metallic and/or graphene materials, or can be a conductive polymer. In preparation for forming a via using a metallic matrix material such as low temperature solder, the fibers of the fabric can be primed by an electroless plating primer.

In a fourth general aspect of the present disclosure, a flexible system is disclosed for forming large numbers of electrical interconnections between an external device and the conductors of an e-fabric, while not unduly impairing the flexibility of the underlying fabric. The system includes a multi-contact, low density, flexible connecting pad, referred to herein as a "soft connector," which comprises adjoining regions of conducting and dielectric elastomer arranged in alternating stripes, or in some other alternating pattern. In embodiments, the soft connector is compressible, and is attached to a backing sheet, which in turn is attached to the e-fabric in a manner that compresses the soft connector against a plurality of connecting pads arranged in a compatible pattern on the underlying region of the e-fabric. In other embodiments, an inflatable bladder is included between the soft connector and the backing sheet, and is inflated so as to press the soft connector against the connecting pads of the e-fabric. These arrangements form a plurality of electrical interconnections distributed over a contact region of the interconnecting system that remains flexible due to the elastomeric nature of the soft connector.

A flexible connection pad of alternated conducting and insulating elastomer regions forms a plurality of interconnections between an external device and the conductors of an e-fabric, while not unduly impairing the flexibility of the e-fabric. The flexible pad is pressed between a backing sheet and a corresponding arrangement of contacts on the e-fabric, due to compression of the flexible pad or inflation of a bladder behind the flexible pad. The backing sheet can be coated and/or laminated, and can be part of an enclosure that contains an external electronic device. Power and signals can be conveyed through the backing sheet by vias and/or by providing windows in the backing sheet. Provided windows can be hermetically sealed to the flexible pad and/or to the electronic device. The backing sheet or enclosure can be removable. Laminated metal and non-metal layers thereof can provide hermetic sealing and EMI shielding.

In various embodiments, the soft connector is attached to external connection points provided on an exterior surface of the backing sheet. In some of these embodiments, vias connect the external contact points with attachment locations on an interior surface of the backing sheet. In other embodiments, a "window" is provided in the backing sheet so that an electronic device can be connected through the window directly to the rear surface of the soft connector.

In various embodiments, the backing sheet is part of a containment pocket or pouch that is configured for containing electronic device. In some embodiments, the pouch is a hermetic heat seal pouch made of flexible, coated, laminate fabric.

In embodiments, the pouch includes a water resistant and water vapor resistant barrier layer which includes laminated aluminum foil and/or metalized or non-metalized PET film. Furthermore, in some embodiments the inner and outer faces of the laminate pouch are layers of pigmented thermoplastic polyurethane ("TPU") that can be heat sealed for high strength hermetic bonds to permit assembly of the pouch.

This use of metallic layers, for example of silver or aluminum, in various embodiments for water permeation control is also effective for the shielding of EMI from active, high speed digital circuits contained in the pouch. For pouches which contain wireless devices, antennas can be located on the outer pouch surface, outside of the EMI shielding. A ground plane can also be included in the pouch as part of the antenna configuration.

Depending on the embodiment, an electronic device contained in the pouch can be connected to the internal attachment locations (or through a window directly to the soft connector) by low temperature solder, or by conductive adhesives. The physical attachment of the backing sheet to the thermoplastic polyurethane ("TPU"), circuit panel, or other structural elements of the contained electronic device can be further enhanced by a non-conductive adhesive that surrounds the contacts. In some embodiments the vias that conduct the signals and power from the inner contact points through the backing sheet to the soft connector are fabric vias. As noted above, in other embodiments the backing sheet is cut to form a single window or a pattern of windows so as to expose the interior of the pouch directly to the contacts on the soft connector. In some of these embodiments, the electronic device is adhesively bonded to the backing sheet around the contact openings so as to form a hermetic seal.

In a fifth general aspect of the present disclosure, e-fabrics, including stretch e-fabrics, and garments made therefrom are disclosed that have economically applied conductors, including across the seams thereof, without concern for registration between the conductors and the underlying fabric, and without concern for registration between panels of a garment or other multi-panel fabric assembly. The e-fabrics include conductors that are bonded to the fabric by a ribbon of adhesive. In embodiments, the conductor and ribbon of adhesive, and in some embodiments also a covering layer of textile tape, are pre-assembled and then applied as a conducing assembly to the fabric. In embodiments, the adhesive is a thermoplastic polyurethane ("TPU") and the conductive assembly is heat-sealed to the fabric.

In embodiments, the e-fabrics are formed by preassembling conductors with ribbons of adhesive to form conducting assemblies, and then bonding the conducting assemblies to fabric or to pre-manufactured garments, including across seams thereof. The conducting assembly can include a textile covering tape applied over the conductor and adhesive. In embodiments, the adhesive is TPU and the conducting assemblies are heat-sealed to the fabric. Stretch fabrics are accommodated by configuring the conductor in a zigzag, crimped, or helical configuration and using a stretchable textile cover tape. Conductors can be bare, coated, or fiber covered copper wires, or conductor-filled polymers. Vias can be included to form connections between conductors and connection pads, electronic devices, and/or other conductors located on an opposing side of the fabric, or on another layer of a multi-ply fabric.

In some embodiments, the conductors are either bare copper or insulated by a thin polymer coating, and can be either round or flat. In other embodiments the conductors are fiber wrapped. Embodiments having round conductors are used in some cases for routing around corners. Some stretch fabric, embodiments include crimped and/or zigzag patterned copper conductors bonded to the fabric by high stretch TPU.

Disclosed methods for heat-sealing conductors to an e-fabric include applying hot air or hot rollers to a thermal polyurethane ("TPU") ribbon preassembled with a conductor, and in embodiments also with a fabric cover tape. "Plotter-cutter" equipment can be used for larger scale manufacturing applications.

Embodiments are processed on cut panels, which avoids any need to register the conductors with the textile. Some of these embodiments are applicable to garments. Vias can be included e.g. for connecting the conductors to pads or for forming connections between conductors applied to opposite sides of the fabric. Some of these embodiments do not require seam vias, which can be a major simplifying factor for manufacturing.

In a sixth general aspect of the present disclosure, a garment is disclosed into which at least one of position, orientation, flexion, and acceleration sensors are integrated, whereby a user wearing the garment is able to control aspects of an audiovisual presentation through movements of various bodily regions, but without direct skin contact by sensors or direct sensing of muscle activity. In embodiments, movements of the arms, legs, head, and/or neck are sensed by the garment. Various embodiments of the garment further include panels comprising finger-operated buttons, and/or slider controls. Embodiments include acoustic feedback features such as speakers or other audio output devices, for example incorporated into a hood worn by the user.

In embodiments, the garment, such as a hoodie, includes position, orientation, flexion, and/or acceleration sensors that enable a user to control aspects of an audiovisual concert such as volume, balance, tone, recorded feedback, and mashups, as well as light displays and pyrotechnics by physical gestures. Embodiments further include panels with buttons and/or sliders for additional control options. Incorporated audio output devices in a hood of the garment can provide audio feedback to the user, and/or outwardly directed devices can provide audio presentation to others. A Bluetooth interface can control external devices. An included battery can power sensors and other devices. Optical display features such as woven light pipes of grouped lengths and/or fiber optics integrated into the garment can display a beat trace or other optical effects that complement performed music. Sensors can be piezo thin film laminate sensors and/or piezo fiber strain sensors.

Embodiments further include a battery incorporated in the garment that is configured to provide primary and/or auxiliary power to sensors and/or other garment devices. Various embodiments include wireless communication features such as Bluetooth devices for communication with amplifiers, speakers, lights, pyrotechnics, and other audiovisual apparatus that are external to the garment. In embodiments, the garment is a so-called "hoodie," being a knit jacket including a head-covering hood.

Embodiments further include optical display features integrated into the garment that can be used, for example, to display a beat trace or other optical effects that corresponds with or complement the music being performed.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2A illustrates a "smart" fiber according to an embodiment of the present invention, wherein an active device is embedded in a central portion of the fiber;

FIG. 2B illustrates a printed conducting path that provides for conductive connections between active devices in a textile panel;

FIG. 3A is a top view of a pair of interconnect pads containing printed connecting paths;

FIG. 3B is a side view of a seam formed between the interconnect pads of FIG. 3A;

FIG. 4A illustrates an embodiment of the invention that includes discrete active elements interconnected by continuous active elements;

FIG. 4B is an enlargement of a portion of FIG. 4A;

FIG. 4C is an enlargement of a portion of FIG. 4B;

FIG. 4D is a cross-sectional view of FIG. 4C;

FIG. 14A is a front view of a hooded garment formed using e-fabric with conductors and vias according to an embodiment of the present invention;

FIG. 14B is a rear view of the hooded garment of FIG. 14A;

FIG. 18 is a plurality of cross sectional views that illustrate various configurations by which conductors are incorporated onto or into e-fabrics;

FIG. 22A is a cross-sectional illustration of an embodiment that includes a stretchable helical conductor;

FIG. 22B is a cross sectional illustration of an embodiment that includes a stretchable crimped conductor;

FIG. 26 is a group of cross sectional illustrations of embodiments having different numbers of conductors, and which include or do not include a textile tape covering;

DETAILED DESCRIPTION

Figure 1:
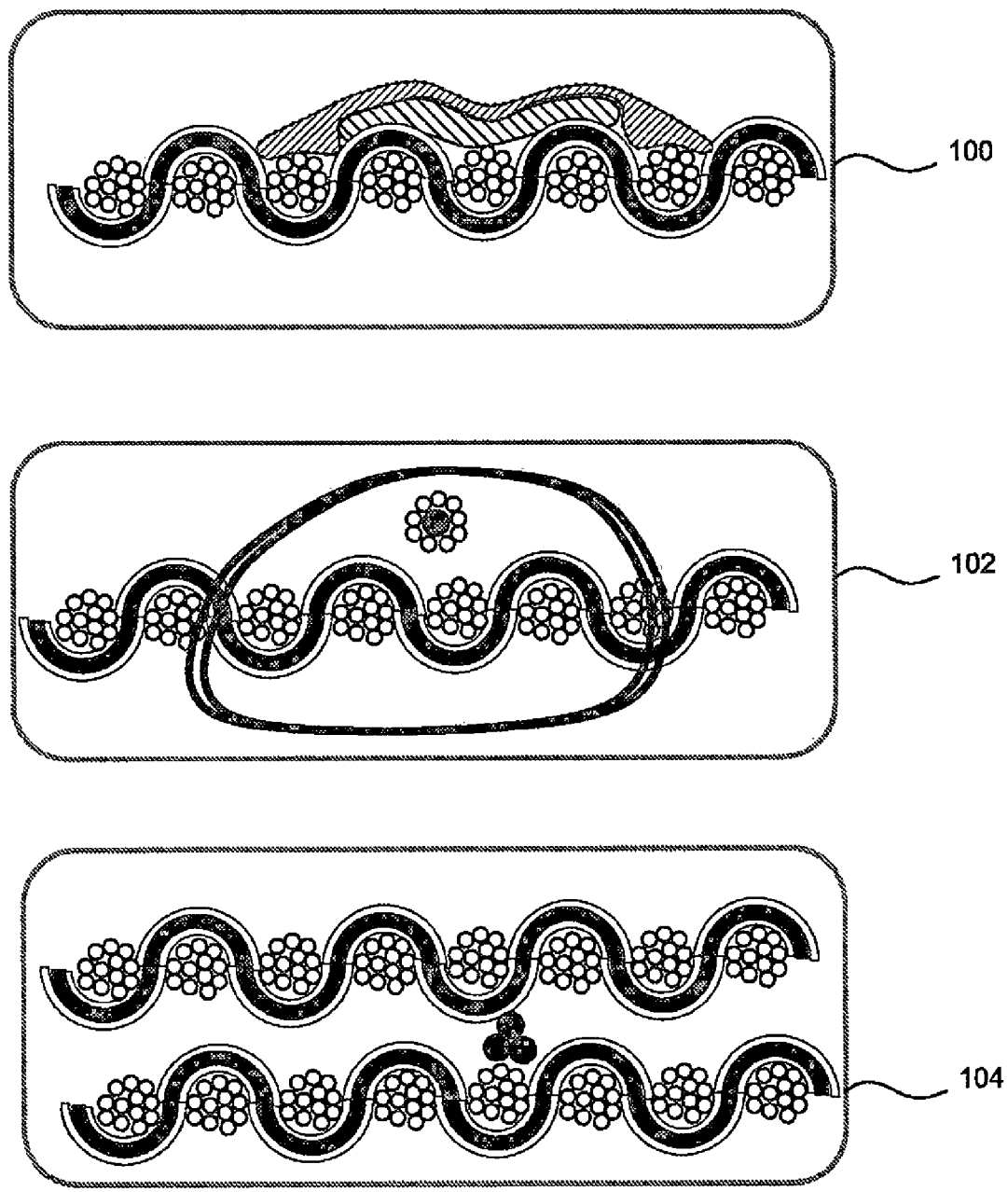
FIG. 1 is a plurality of cross sectional views that illustrate various configurations by which conductors are incorporated onto or into e-fabrics.

According to the first general aspect of the present disclosure, methods are disclosed for providing textile registration for interconnecting active electronic devices embedded within "smart" textile fibers, for cutting vias into the smart fibers, and for forming electronic interconnections between textile panels. In embodiments, these features are provided while at the same time maintaining an esthetic fabric appearance.

The disclosed methods employ new materials, coatings, and etching processes. The disclosed manufacturing approaches includes methods for the manufacture of smart, uniform fabric systems using advanced textile digital printing, and material deposition using modern line-scan inkjet processes.

Pattern Alignment

The control of pattern accuracy, pattern distortion, and part registration is critical to all aspects of traditional electronic interconnections, and the same is true for the methods disclosed herein. The description that follows describes the disclosed methods with reference to woven materials. However, it will be understood that the disclosed methods can be easily adapted by one of skill in the art for application to knit structures.

The locations and alignment of yarns can be very tightly controlled on weaving machines. The reed on a typical weaving machine is a high accuracy yarn location control device, whereby the dents or spaces in the reed are controlled to approximately +/−0.005" positional error in the cross machine direction. The reed also locates the filling yarns in the machine direction to a similar tolerance. In addition, many weaving machines can be programed to run long, complex garment size patterns with up to 8 different yarns in the filling, and for some weaving machines the warp can have similar complex patterns of yarns.

Unfortunately, this tight control of yarn positions is not typically maintained after the weaving is completed. Generally, only very high density woven fabrics have the bias stiffness to resist distortion after weaving to a degree that would emulate a flex circuit film substrate. Overall, the fibers in wovens and textiles shift and move by design for wearing comfort. This is a serious consideration for interconnect processing between smart fibers that must occur off loom, and the options for reacquiring the woven pattern after wet finishing and other roll to roll processing are limited. In general, wovens off-loom have 3 registration issues:

1) pattern location;
2) pattern scaling in the x and y directions due to shrinkage and crimp; and
3) pattern distortion due to bow, skew and hook.

The present invention overcomes these problems by creating non-visible fiducials while the textile panel is still on the weaving machine. In embodiments, the fiducial set for a pattern of smart fibers is frequent enough to permit all 3 types of registration problems to be corrected. Embodiments use IR phosphors or other markers to form the fiducials in both the warp and fill yarns that are woven into a grid having a crossing point spacing that permits location of all of the internal features in the grid.

In embodiments, processing a garment panel for interconnection includes mapping the grid with a machine vision system, and then transforming the interconnect patterns to match the distorted pattern in the textile.

Certain embodiments employ on-loom lamination of the textile. According to these embodiments, the textile is bonded to a substrate such as a 6-15 mil thick PET film, typically by using a thermoplastic adhesive, while the fabric is still on the sand roll of the loom. Such on-loom lamination can greatly reduce the type 2 and 3 distortions described above, such that textile processing for interconnection only requires a basic pattern location step. A key issue for this lamination approach is to permit wet scour of the fibers to enable adhesion of the interconnect layers. After interconnection of the layers, the textile is removed from the film and final finishing of the fabric is completed.

Fiber Via Etching and Printed Interconnects

As a preface to the discussion of fiber vias and interconnect print patterns, it should be noted that all the registration transforms must be used from the alignment step as described above. In addition, in embodiments the patterning is done for garments with sizes. For example, in embodiments each pattern for each garment panel must be graded for at least 6 sizes.

Embodiments of the present invention use chemical etching and/or chemically enhanced laser etching to selectively connect to conducting filaments in the smart fibers. Embodiments employ a plurality of etch systems that includes separate chemistries for each conductor type included in the pattern. This localized etch approach allows vias in the fibers to be separately created for each conductor type.

Certain embodiments use selectively doped segments in the smart fibers as a cover material over each electrode. And in some of these embodiments each polymer cover segment is matched for solubility with an etchant. In similar embodiments, the cover segment are also matched to various laser wavelengths so as to open vias by obtaining high couplings at a specific wavelengths.

In various embodiments, the etching chemicals are applied using an inkjet printing process. In some embodiments where laser energy is required to assist with the selective etch, the etching process is integrated with the interconnect printing process described below so as to achieve registration of the textile and the via etch processes.

In other embodiments the etching process proceeds in much the same manner as is applied currently to printed circuit boards ("PCB's"), whereby a developable photoresist is applied to an entire garment panel and then wet etching is run on the panel. The process is then repeated with a new resist for each conductor set. While this approach has some advantages, it can be much more process-intensive than the local patterned etch process described above.

FIG. 2A illustrates a "smart" fiber 200 according to an embodiment of the present invention, wherein an active device 202 is embedded in a central portion of the fiber 200, and a signal or power conducing filament 204 is included near an outer boundary of the fiber 200. As shown in the figure, access to the conducting filament 204 is provided by an etched via 206 that exposes a portion of the conducting filament, such that the exposed portion functions as an electrode.

With reference to FIG. 2B, in embodiments a printed pattern of conducting paths 208 provides for conductive connections across intervening yarns 210 between vias 206 and/or between vias 206 and connector pads (item 300, FIG. 3A) on a textile panel. In some embodiments, these connections are formed using ink jet printing with conductive inks. In various embodiments, a similar printing process is also used to cover and coat the conductive paths with dielectric coatings that protect the conductive paths and maintain the wash compatibility of the textile.

So as to maintain an aesthetic appearance, in embodiments the interconnect printing process is integrated with a visible pattern printing of the garment, whereby the interconnections are integrated into visual designs and create an overall, high level aesthetic value.

Interconnect and Garment Seams

While great progress has been made with computer controlled double bed knitting for full garment production, not all garments can be made from knit fabrics, and woven materials continue to require sewn seams. With reference to FIGS. 3A and 3B, by using the printed interconnect patterning as described above, embodiments provide contact pads 300 in garment seam allowances which are used as a type of flex-connector between panels 308 in a sewn garment. In these embodiments, the printed interconnections run to the panel edge, and the larger pads do not have a cover coat. So as to form an interconnecting seam 306 between garment panels 308, a conductive adhesive is applied to the matching pad patterns 304 between the two panels 308, the pads 300 are aligned, and the seam 306 is sewn normally. In embodiments, this technique is used for soft off-garment connections to traditional devices.

According to the second general aspect of the present disclosure, FIGS. 4A through 4D present successively enlarged views of a preform 400 in an embodiment of the invention that comprises an ordered, polymeric sheath 402 surrounding a low modulus polymeric or elastomeric matrix 404. A plurality of active elements 406 are encapsulated by the matrix 404 within the sheath 402. The active elements 406 include deformable discrete elements 408 paired with deformable continuous elements 410. In similar embodiments, the discrete elements are not necessarily deformable. As can be seen in FIG. 4D, the illustrated embodiment includes 3 continuous conducting elements 410 that are associated with and interconnect the discrete element 408. In various embodiments, the discrete elements can include sensors, piezoelectric devices, and/or other semiconducting elements.

Continuous and Discrete Types of Active Elements

Embodiments of the present invention incorporate either or both of discrete and continuous active components within multicomponent, photonic, electronic, and/or sensor fibers. In most cases, discrete elements are either preferably or necessarily fabricated using inclusions or discrete discontinuous particles or elements that are made from materials that are harder and less flexible than the materials that are typically included in fibers. Continuous elements are typically fabricated from continuous, non-fiber materials that are also harder and less flexible than the materials that are typically included in fibers. Continuous elements in particular are not functional if made from discontinuous elements.

Matrix Materials

There is a wide range of materials that are suitable as an encapsulating matrix surrounding discrete active elements. The size and size distribution of the discrete active elements, the sizes of the elements relative to the matrix layer thickness, and the density of the discrete elements will all strongly affect the bending modulus. Accordingly, as the density of the discrete elements increases, the modulus of the fiber increases unless the increase is compensated by a reduction in the stiffness of the matrix material. In embodiments where the density of the discrete active elements is nearly continuous, thermoplastic elastomers are used as the matrix material. Thermoplastic urethanes, olefins, and blended systems are all used as matrix materials in various embodiments of this type.

Processing Discontinuous Mixtures

Embodiments of the present invention include various mechanical solutions to incorporate discrete active elements within a fiber that is highly bendable and compatible, and thereby suitable for incorporation in textile and garment structures. Examples combine the discrete elements with a fiber compatible matrix elastomer or low modulus polymer by various methods, including thermal processing, solution processing, mixtures with reactive elastomers or polymers, and thin film deposition onto layers of matrix materials.

Quantum Dot Example

As an example, quantum dots can be prepared as a well-dispersed mixture in an appropriate thermoplastic material, and can be included in a preform for fiber drawing. For example, lead oxide based quantum dots can be included, which are of interest e.g. because they can be tuned to bands that are useful for infra-red applications. Because of the discrete nature of quantum dots, the resulting yarn is able to bend piecewise between them, allowing high flexibility without damage to the quantum dots.

In embodiments, the quantum dots act mechanically as a particulate filler in the melt, allowing the quantum dots to extend throughout the fiber, while in other embodiments the quantum dots are confined to a specific layer beneath the sheath. In either case, the properties of the fiber are not strongly affected by the presence of the quantum dots, beyond the effects that would normally result from adding a particulate filler.

Discrete and Continuous Active Element Fiber Drawing

The fibers of the present invention are drawn from preforms. This process causes the matrix layer to be reduced in thickness and in diameter as the preform is elongated into a fiber, while the length of the drawn fiber is increased to a very large multiple of the preform length. This geometric transformation occurs in the continuous matrix and also for any continuous active elements that are included in the embodiment. For discrete active elements, on the other hand, there is little or no deformation unless the discrete active elements are thermoplastic.

General Configurations of the Fiber

In general, the fiber of the present invention can include up to 4 regions:
  Low modulus polymeric or elastomeric core
  Active region made of at least one of a photonic component, a semiconductor, a conductor, and a piezoelectric material, arranged in an annular, segmented, array, or matrix configuration Low modulus polymeric or elastomer covering surrounding the active region and "infil" filling any gaps provided between active elements in the active region Tough, abrasion resistant, high tenacity, polymeric sheath having at least one of the following additional properties: flame retardance, abrasion resistance, textile dye affinity, optical transparency, controlled resistance, and high melt temperature relative to other regions.

EXAMPLE

Figure 5B:
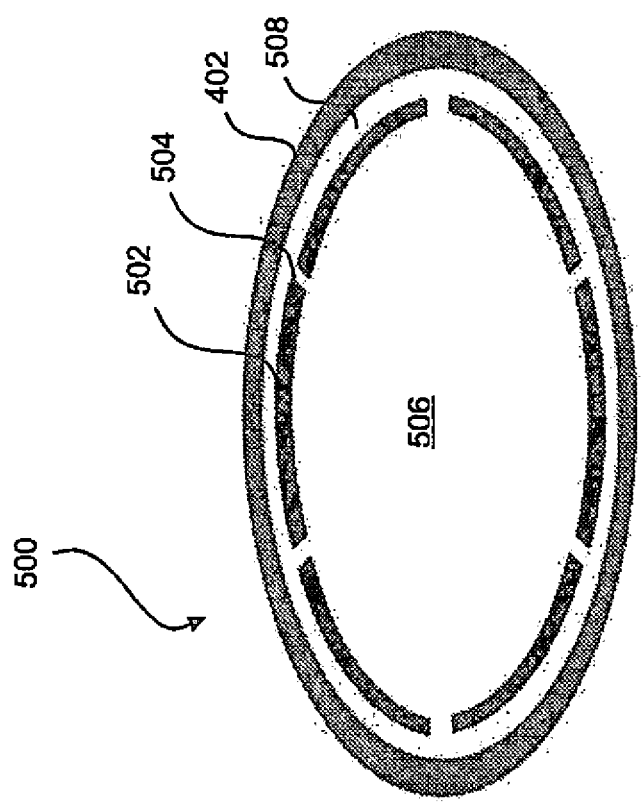
FIG. 5B is a cross-sectional illustration of the embodiment of FIG. 5A shown as being compressed during bending.
Figure 5A:
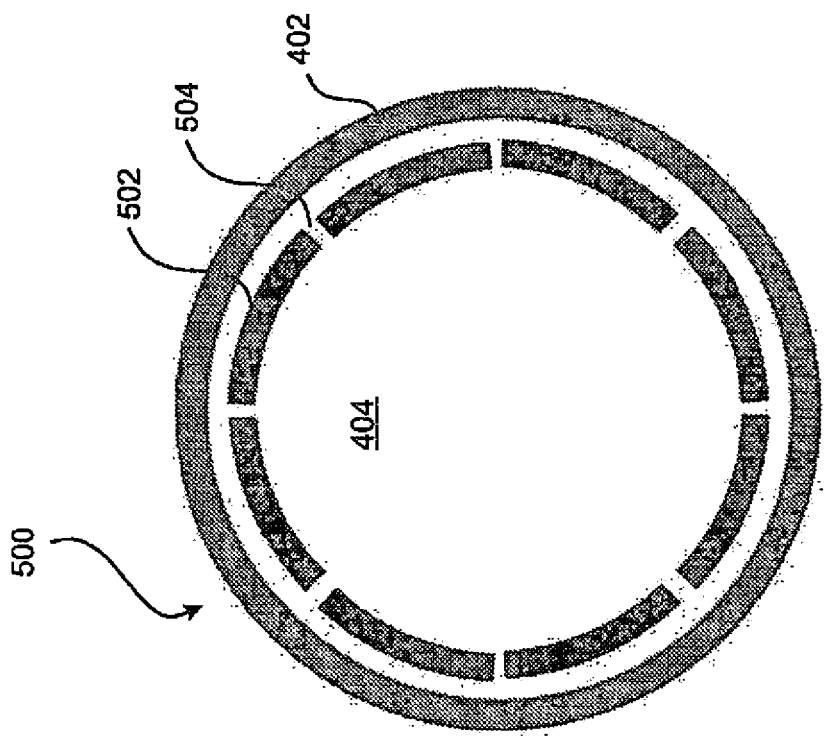
FIG. 5A is a cross-sectional illustration of an embodiment of the invention that includes a continuous, longitudinally segmented active element.

FIGS. 5A and 5B illustrate an embodiment that is a 200 micron diameter fiber (100 micron radius) 500. In various embodiments that include a continuous glass band gap or other continuous photonic or electronic active element that surrounds the central axis of the fiber 500, the active structures are separated into between 2 and 12 segments 502 separated by longitudinal gaps 504. In the embodiment of FIGS. 5A and 5B, the active element is separated into eight arc segments 502 having glass layers that are between 15 and 20 microns thick and are arranged as a band gap glass-dielectric sandwich.

By dividing the active element into a plurality of segments 502, the stresses applied to the active element during bending of the fiber of FIGS. 5A and 5B are significantly reduced. As shown in FIG. 5B, during bending the segments 502 are able to move toward and away from each other, so that the deformation is mainly accommodated by the elastomer 404, and stresses are applied separately to the element segments 502, rather than to the active element as a whole.

The embodiment of FIGS. 5A and 5B includes a hard, high modulus sheath 402 that is approximately 20 microns thick, which is between 10% and 30% of the radius of the fiber. The materials for this sheath layer have toughness, high elongation to failure, and high modulus, with strain to failure of greater than 3% and an effective tenacity of greater than 4. Various embodiments include polysulfone, cyclic olefin copolymers, PEN, and/or PET as materials for this sheath layer. According to the requirements for a specific embodiment, the optical clarity, flame resistance, and/or compatibility with dyeing process are considered as part of the selection process for the sheath material in various textile and garment applications of the resulting fiber.

The embodiment of FIGS. 5A and 5B includes a soft thermoplastic urethane cover 508 and core 506 that surround and encapsulate the active glass segments 502. Embodiments include as much elastomer as possible on the outer face 508 of the glass segments 502, within the constraints allowed by the design of the fiber cross section. In the example of FIGS. 5A and 5B, the core 506 is 50 microns in diameter and the TPU layer 508 on the sheath side of the glass segments 502 is 10 microns thick.

Bending Mechanics

The present invention improves the fiber bending mechanics of fibers incorporating discrete and/or continuous active elements by encapsulating the active elements within a very soft low modulus polymer or elastomeric fiber matrix that allows the fiber to deform during bending so that, for example, a normally round cross section, as shown in FIG. 5A, is deformed into an elliptical cross section, as shown in FIG. 5B. By encapsulating the segmented, brittle glass segments 502 between the elastomeric core layer 506 and the elastomeric outer layer 508 between the glass segments 502 and the sheath 402, the embodiment of FIGS. 5A and 5B decouples the shear stresses applied to the glass segments 502. As the sheath material 402 loads up in tension and compression during bending, the stresses applied to the glass layers 502 or other photonic, semiconductor, conductor, or other active elements can only be loaded through the intervening elastomeric buffer layer. The low modulus of this core matrix material 404 of 100-500% elongation to break thereby limits the stresses applied to the higher modulus active layers 502.

Melt Temperatures, Draw Orientation and Fiber Elastomer Core Properties

According to the requirements of each embodiment, the glass or other active element material and the low modulus polymer or elastomer matrix material are selected for both their thermal and optical properties. Once the preform has been prepared, the fiber is formed by drawing it from the preform, with a ratio of fiber to preform diameter of between 200 and 600. The melt compatibility of the selected active element, matrix, and sheath materials is an important design constraint. Selection of an appropriate urethane crosslink density is a useful approach for matching the melt flow temperatures with the active element material (e.g. chalcogenide glass) and the sheath material.

Higher melt sheath materials are included in some embodiments because they permit the sheath to be oriented during the draw for improved modulus and tensile strength. The glass (or other active element material) and elastomer need not be oriented, and can remain in an amorphous state after drawing.

The lower the durometer of the elastomer, the more compliant the structure will be under bending. Many TPUs have a Shore A durometer value of approximately 80, which is a useful hardness for many embodiments. Blending the TPU with softer components, reducing the crosslink density, and/or adjusting the molecular weight of the elastomer are all methods used to adjust the hardness of the matrix material in various embodiments.

Careful control of the drawing process is important for achieving the desired, critical dimensions of the resulting active element or elements. For example, the gap between dialectic-glass sandwich layers in embodiments is typically adjusted to be about one half of the light wavelength of interest. This critical dimension can be controlled by very fine adjustment of the draw ratio from standard preform diameters.

According to the third general aspect of the present disclosure, the present invention is an e-fabric and a method of production thereof, wherein the e-fabric includes connections to internal devices, connection pads for connection to external devices, and/or vias that form interconnections between conductors that cross over each other on and/or within the fabric, as well as methods for forming such connections.

Conductors

Figure 6A:
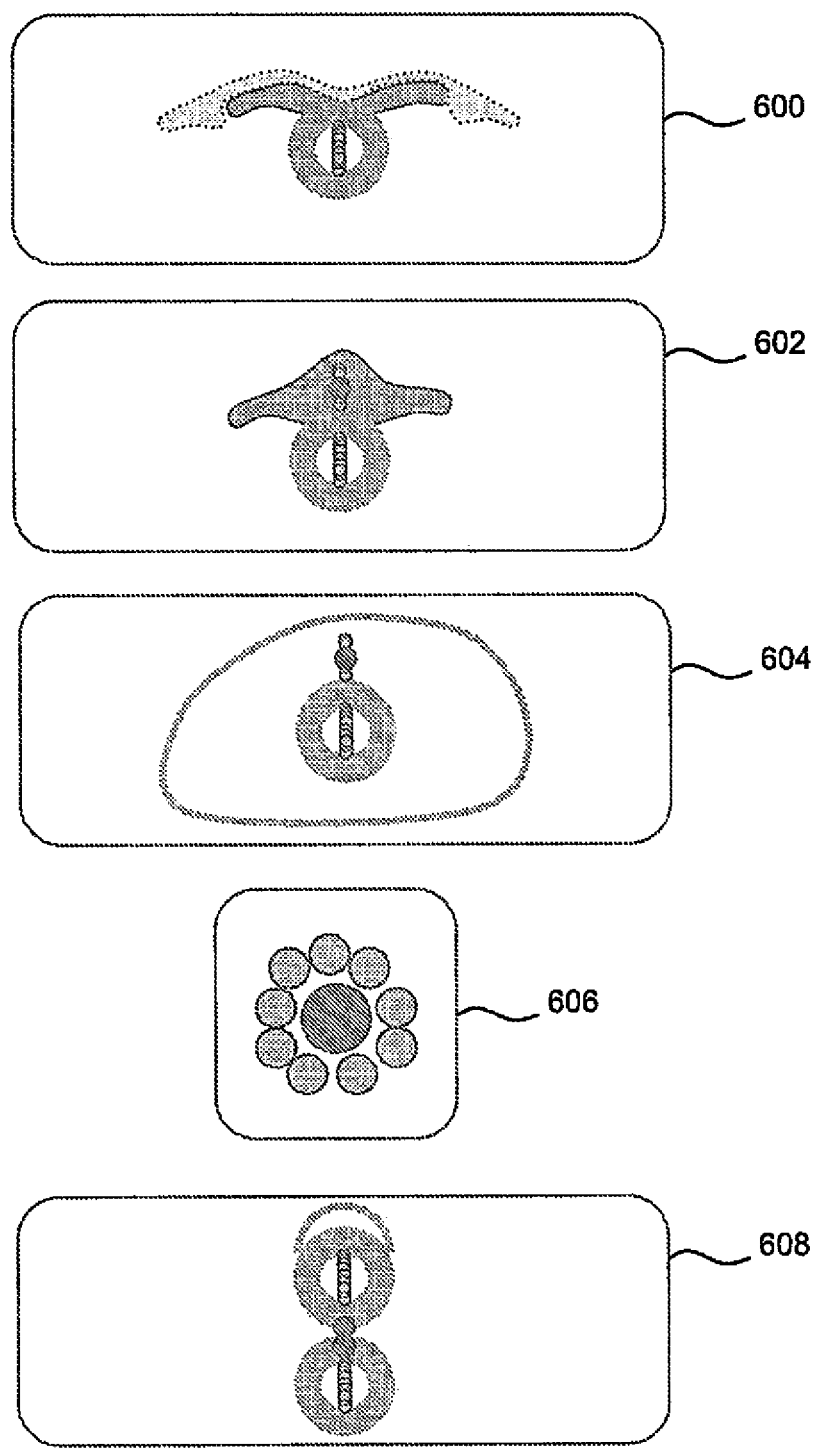
FIG. 6A includes a plurality of cross sectional views that illustrate various configurations by which conductors are incorporated onto or into fabrics in embodiments of the present invention.

With reference to FIG. 6A, various approaches can be used to incorporate conductors onto or into e-fabrics. For example, conducting inks can be printed using either 2D or 3D printing onto one or both sides of the fabric 602. Such printed conductors are typically protected by covering overcoats 600. Similarly, conductors can be stitched to fabric using applique 604.

Another approach is to weave wires as fibers into the fabric itself in either the warp or fill direction, or both 606.

As noted above, various approaches can be used to direct conductors in a plurality of directions that cross over each other, for example by printing or heat-bonding conductors on both sides of a fabric, or by weaving wires as fibers in both the warp and fill directions. Furthermore, a fabric with more than two "levels" (i.e. planes) of conductors can be provided by stitching together a plurality of fabric plies into a multi-layer fabric 608.

General considerations that typically apply to conductors in e-fabrics include:

Conductors must operate across textile seams;

Conductors must provide connections on both sides of the fabric;

Conductors must connect to devices such as active buttons and multi-component fibers;

Textile bias stretch can put conductors into shear;

The potential for copper conductors to become work-hardened must be controlled; and Printed conductors have to be wash fast and durable.

Embodiments that include printed conductors 100 use conductive inks that are fully wash fast. Some embodiments include cover coats and/or binders. In embodiments where the conductive ink includes a noble metal filler, printers having microelectromechanical systems ("MEMS") print head configurations cannot be used because of the large sizes of the noble metal particles. These include various digital printers, screen printers, and some specialized digital printers.

Embodiments of the present invention use graphene-based inks, most of which are compatible with digital printing using MEMS print heads. However, some binders used in graphene ink designs create thermal challenges (250 C, 480 F).

In various embodiments, printed conductors are applied on cut panels of fabrics, so that registration to the textile is not required. However, it is necessary to include fabric vias in many of these embodiments so as to provide pads or contacts on opposing sides of the textile. In addition, many of these embodiments require seam vias, and embodiments also provide connection pads and/or contact pads.

Certain embodiments make use of inks containing magnetic conductive particles, which can be self-healing and therefore exceptionally robust when applied to fabrics. For example, graphitic inks loaded with permanent magnetic Nd2Fe14B micro-particles ("NMP") are used in some embodiments to provide rapidly self-healing, inexpensive printed conductors. The incorporation of NMPs into a printable ink can impart a self-healing ability to the printed conducting trace, with rapid (approximately 50 ms) recovery of repeated large (up to 3 mm) damages at the same or different locations, without any user intervention or external trigger. The permanent and environment-insensitive magnetic properties of the NMPs thus result in a long-lasting ability to repair extreme levels of damage, independent of ambient conditions.

This remarkable self-healing capability of NMP-loaded graphitic inks offers distinct advantages in various embodiments over common capsule and intrinsically self-healing systems. Printed NMP systems have been characterized by leveraging crystallographic, magnetic hysteresis, microscopic imaging, electrical conductivity, and electrochemical techniques, and offer considerable advantages for wearable, textile-based electrical circuits and other long-lasting printed electronic devices.

Other embodiments of the present invention use round copper conductors, which are well-suited for routing of a conductor around corners. Also, bending and work hardening at the fabric neutral axis is less of an issue with copper.

Embodiments that include woven conductors 106 require extensive design interaction, from woven patterning to garment patterning. Among the various e-fabric conductor approaches, woven conductors are generally the least visible. However, woven conductors are typically not compatible with knit fabrics.

Typically, woven conductors are incorporated into fabrics as roll goods, thereby requiring that cut panels be registered to woven patterns so as to align the woven conductors to the cut patterns. Also, a second production step is typically required so as to provide vias between warp and fill conductors, including vias provided in the seams.

Vias

Of course, it is not sufficient merely to incorporate conductors onto or into a fabric. It is also necessary to provide connection points or "connection pads" for making interconnections between the conductors and embedded and/or attached devices. And in more sophisticated designs, it can be necessary to provide vias that form bridging connections between conductors that cross over each other.

Figure 6B:
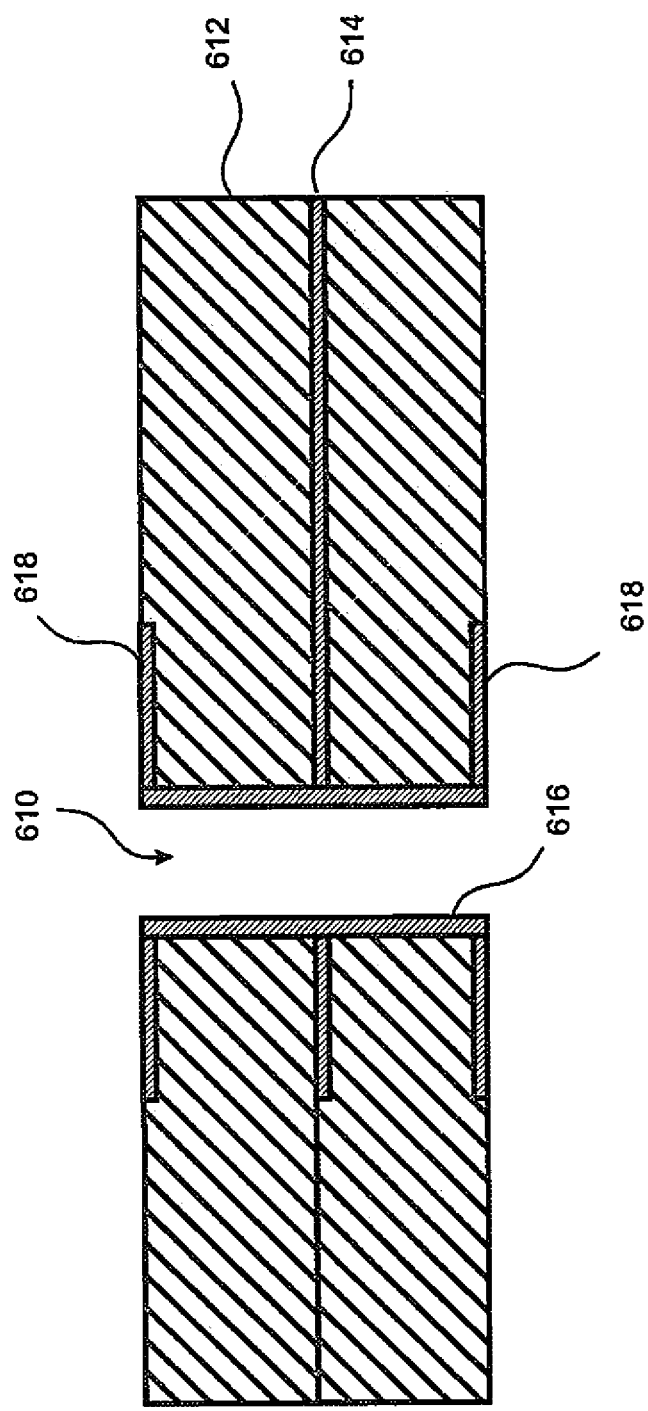
FIG. 6B is a cross sectional illustration of a conventional via in a printed circuit board according to the prior art.

FIG. 6B illustrates the structure of a typical via included in a printed circuit board of the prior art. A hole 610 is drilled in a fiberglass board 612 that includes an inner copper conductor 614, and the interior walls of the hole are plated with copper 616 that extends to connection pads 618 on the top and bottom of the board, so as to provide interconnection between any conductors that cross that location, and also to provide external connection pads for electrical access to the internal conductors.

While an e-fabric via performs a similar function, it differs in several important ways from the conventional via of FIG. 6B. The fibers of an e-fabric may be primed in a manner similar to a plated via, and/or by using an electroless plating primer, so as to enhance wetting of the fibers by solders or a conductive adhesive. However an e-fabric via does not include a drilled hole that can be plated with copper, and the conductor included in the e-fabric is not plated onto the fabric, but is included as a fiber or is printed or otherwise bonded to the fabric. Unlike a traditional circuit board via, an e-fabric via must not make a hole in the fabric or otherwise damage the yarns of the fabric, and an e-fabric via must be able to provide a reliable connection even when the fabric is flexed and washed, whereas a traditional circuit board is rigid and is not subject to any sort of flexing, nor to washing or other liquid or chemical exposure.

Matrix Injection Vias

Figure 7A:
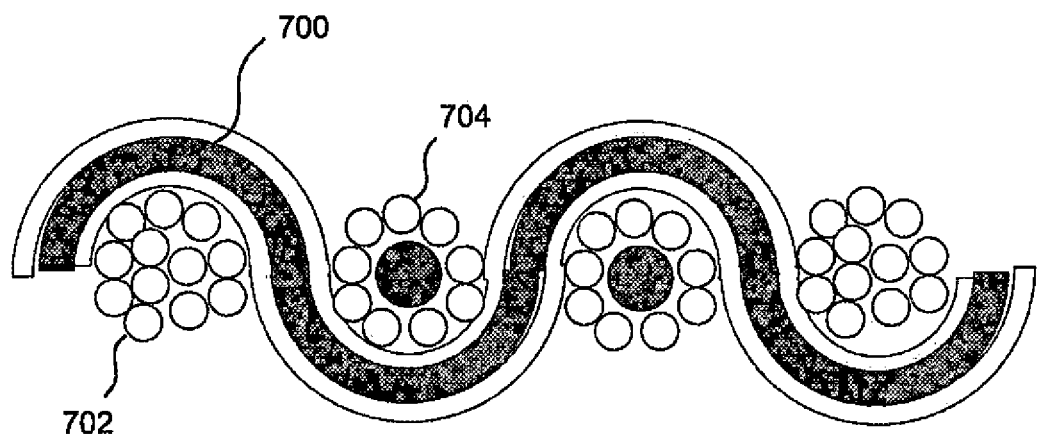
FIGS. 7A and 7B are cross sectional illustrations of a fabric that includes woven conductors, shown before and after application of a via respectively.
Figure 7B:
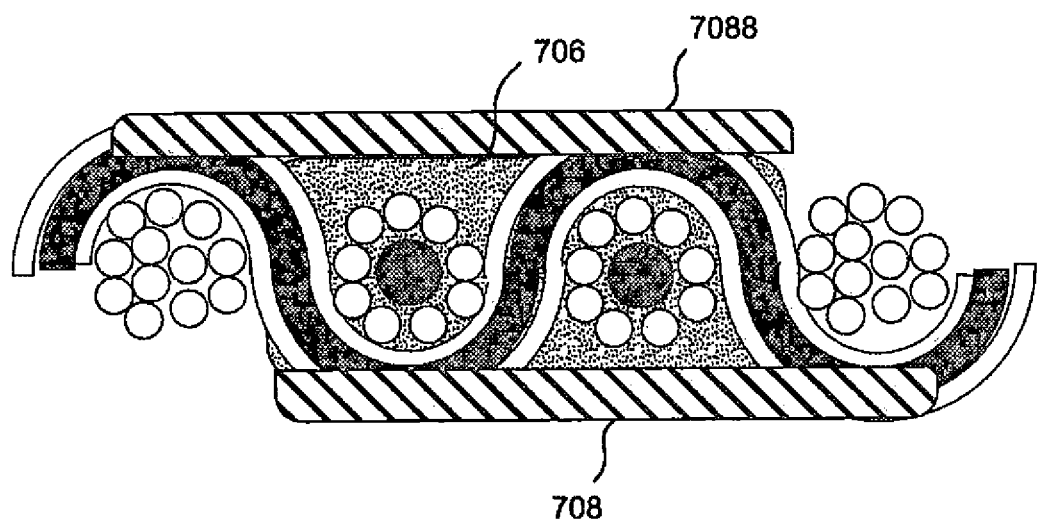

FIGS. 7A and 7B are cross sectional illustrations of an e-fabric, shown before and after application of a via, respectively, in an embodiment wherein the via is provided between warp 700 and fill 704 conductors that are woven as fibers into an e-fabric that also contains non-conducting yarns 702. In this embodiment, a low temperature solder 706 is injected into the fabric at a location where the solder makes 706 contact with both the warp 700 and fill 704 conductors. The solder 706 is overlaid by connection pads 708 of conductive adhesive urethanes. In similar embodiments, a peroxide cure silicon with a conductive filler is used instead of low temperature solder, thereby providing a softer, more flexible via.

Figure 8A:
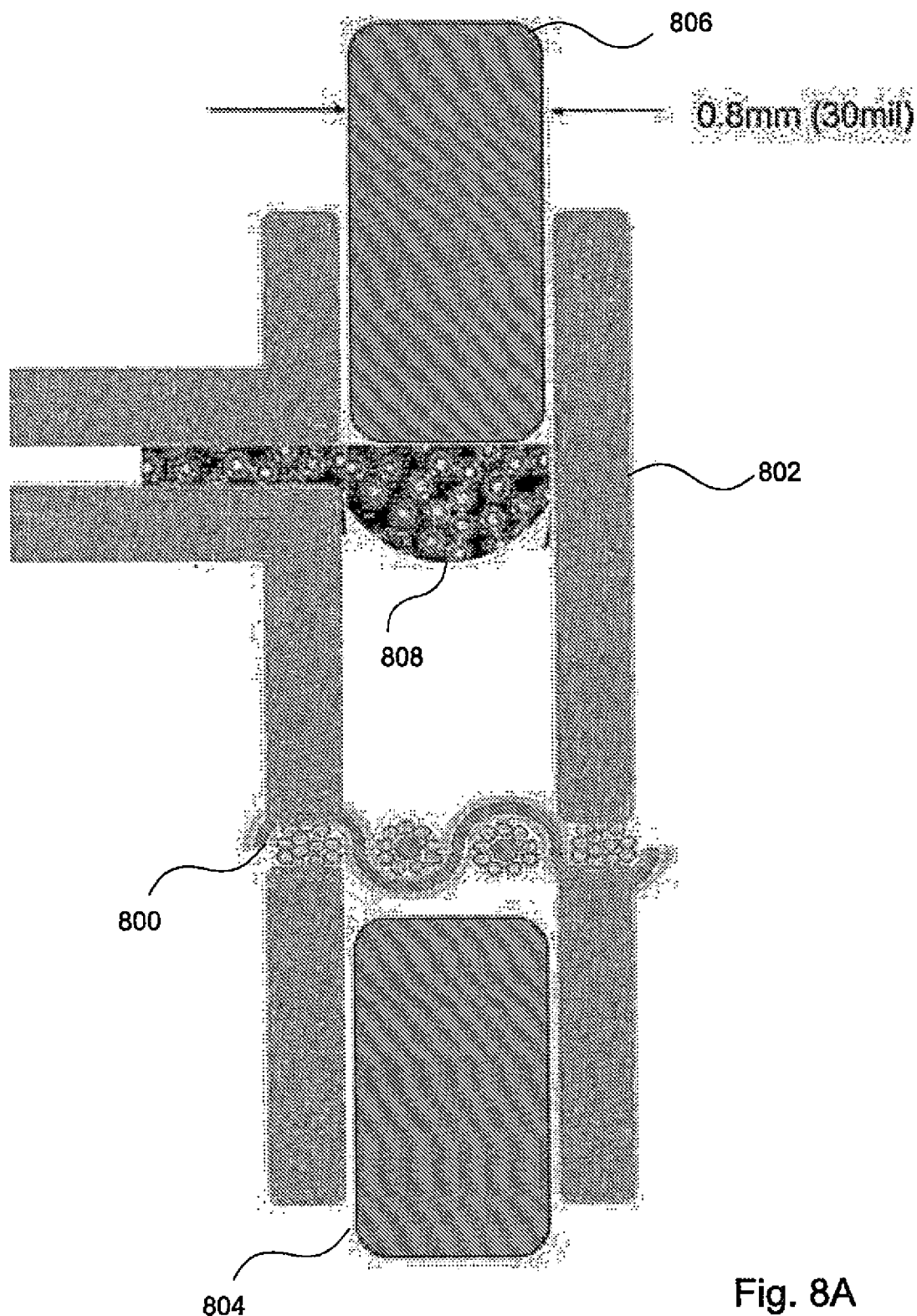
FIGS. 8A through 8C are cross sectional illustrations of an apparatus and method according to an embodiment of the present invention for forming a via by injecting a conductive matrix material into an e-fabric.
Figure 8B:
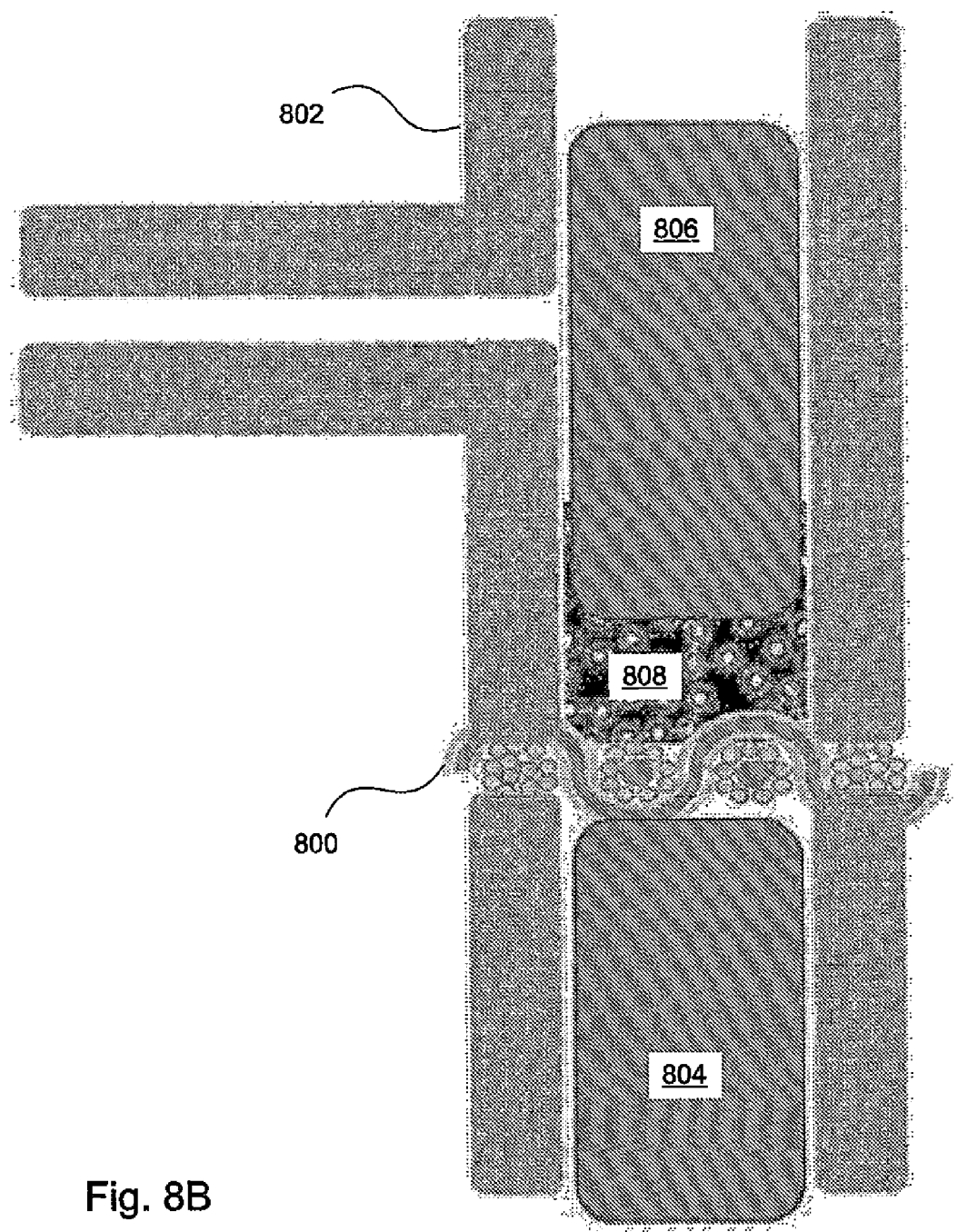
Figure 8C:
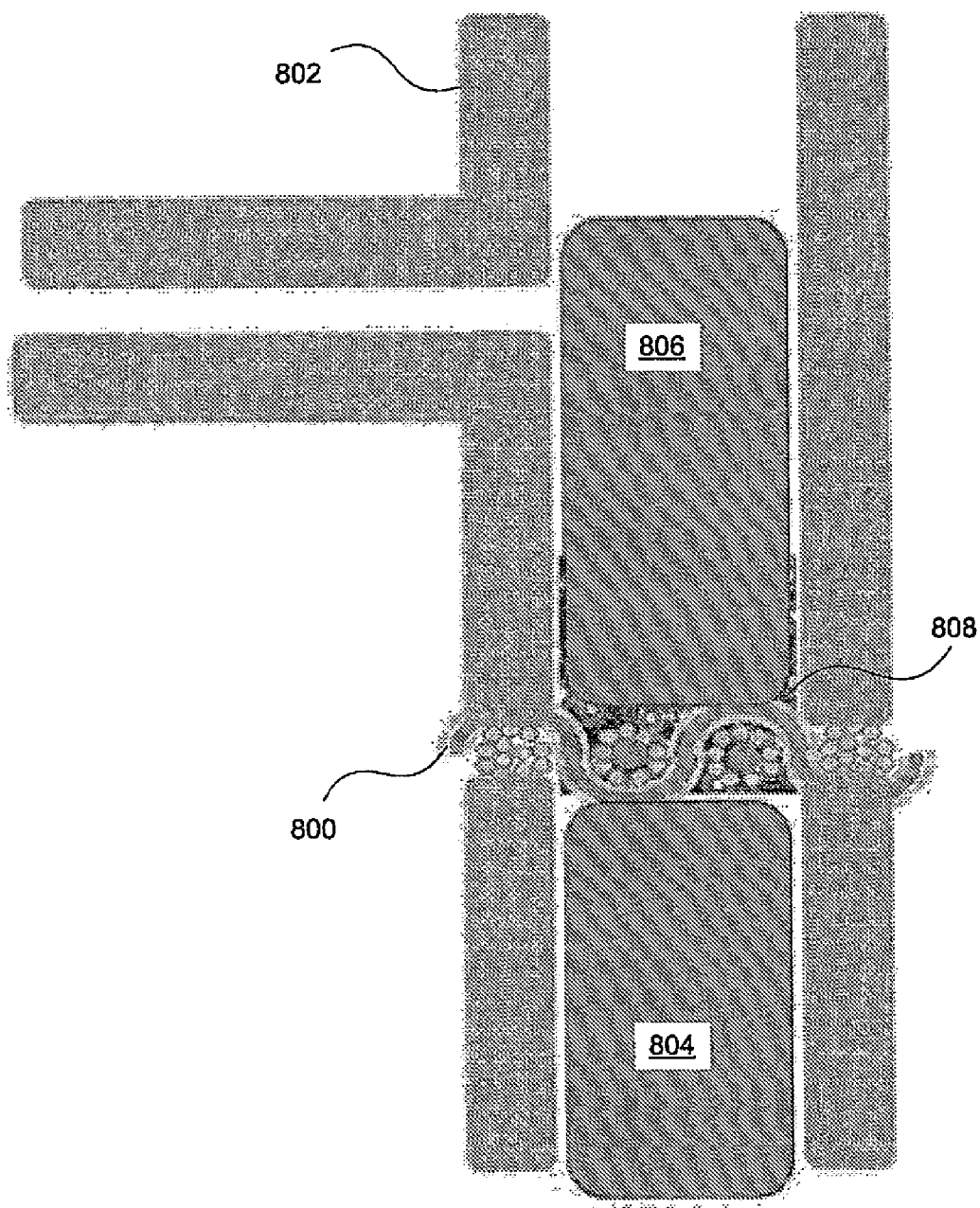

FIGS. 8A-8C illustrate the operation of a press apparatus that is used in embodiments to form vias such as FIG. 7B. The region of the e-fabric 800 where the via is to be formed is clamped between a pair of clamp tubes 802, where the lower clamp tube contains a plug 804 and the upper clamp tube contains a plunger 806. A conductive substance or "matrix" material 808 such as low temperature solder or a peroxide cure silicon with a conductive filler 808, is inserted into the upper clamp tube 802 and pushed downward (FIG.

8B) until the conductive filler 808 is pressed into the e-fabric 800 and forms a connection between the conductors included in the fabric 800.

Figure 9:
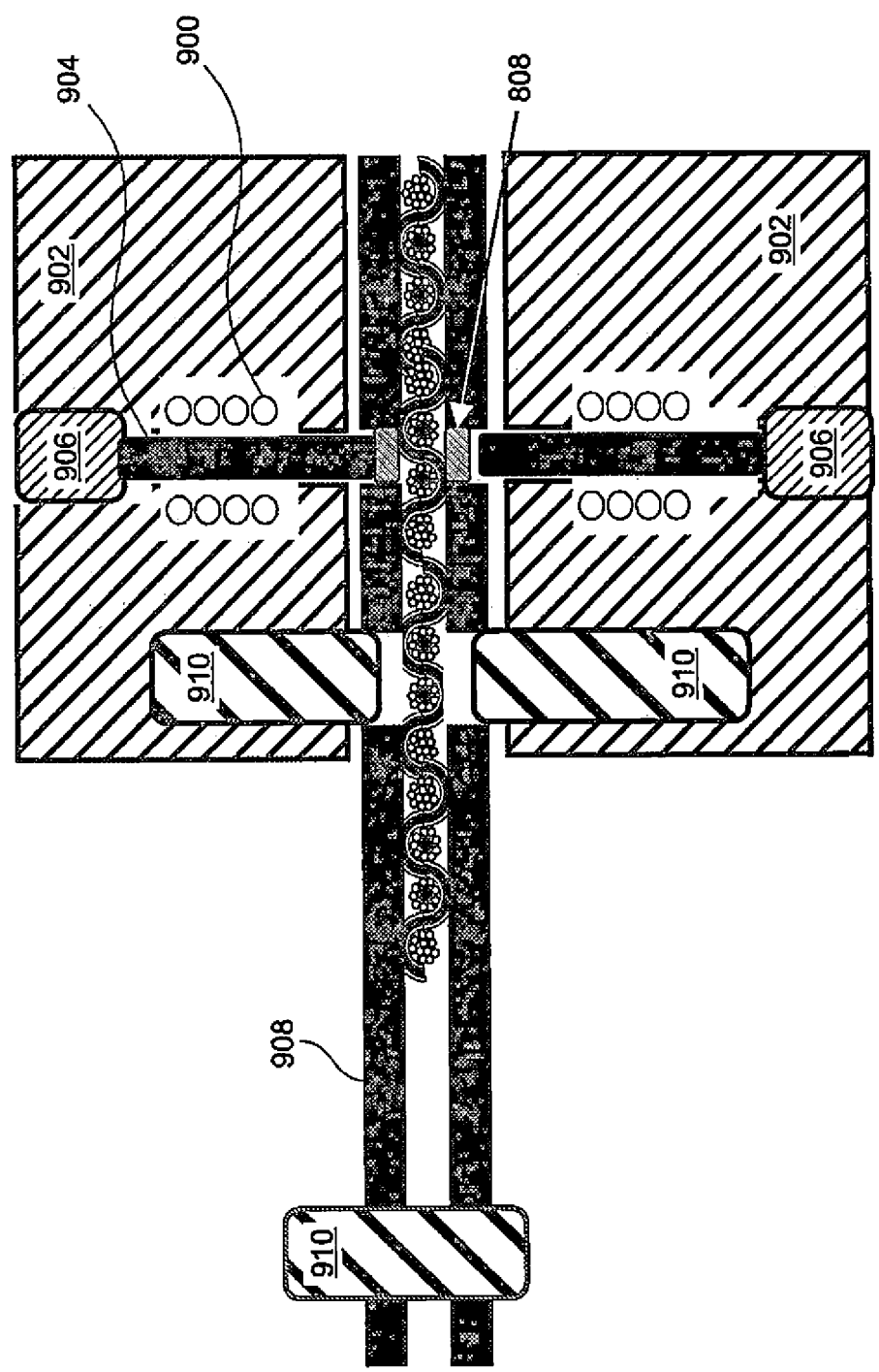
FIG. 9 is a cross-sectional illustration of an apparatus similar to FIGS. 8A-8C, but further including induction heaters.

In some embodiments, the matrix injection is a two-sided process, with both heat and pressure being applied from both sides of the textile. FIG. 9 is a cross-sectional illustration of a matrix injection press apparatus similar to FIGS. 8A-8C in which the plug and the plunger are heated by induction heating coils 900 (1 kW, medium to high frequency) so as to melt the low temperature solder or other conductive substance 808 during injection of the matrix material to form the via. This double sided injection approach tends to move the fibers within the plane of the fabric, rather than driving it in the Z (vertical) direction out of the fabric plane. This is important, because a fiber via should not cause any significant fiber damage.

In the embodiment of FIG. 9, one inch by one inch machineable ceramic pressure blocks 902 include 1/16"×80" shoulder head set screws and 1/32" dowel pins 906 which drive 1/32" diameter hard stainless heating and contact pins 904 into an e-fabric held between six inch square 1/8" thick steel ground stock base plates 908, the assembly being aligned by alignment pins 910.

Figure 10:
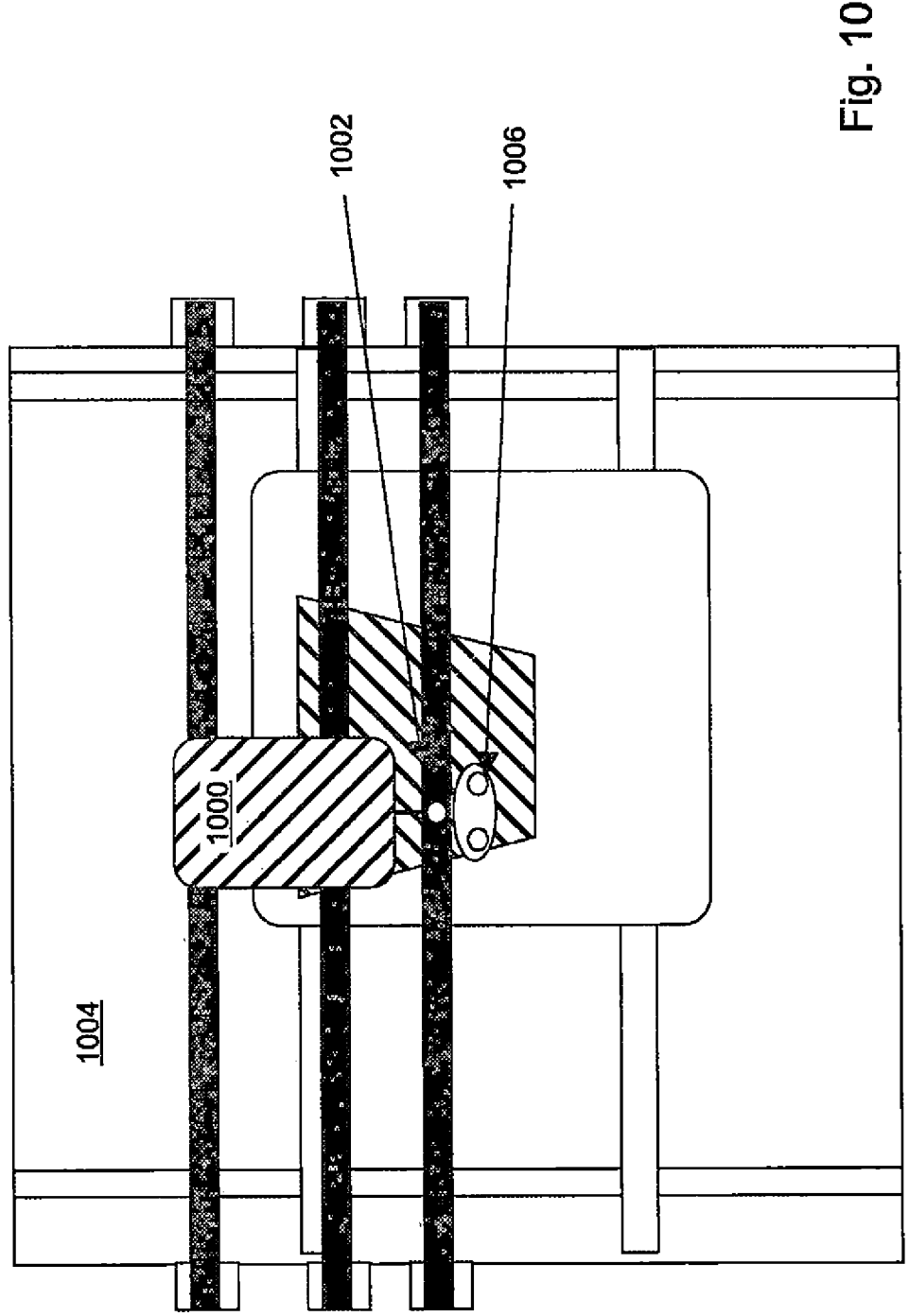
FIG. 10 is a cross-sectional illustration of an apparatus used for precisely locating a via-forming tool above an e-fabric panel in embodiments of the present invention.

An apparatus that is used to apply vias to precise locations on an e-fabric is illustrated in FIG. 10. The illustrated apparatus includes an induction unit 1000 and a via-forming tool 1002 located above a panel transport system 1004, as well as a microscope 1006 that is used to locate and position the panel and tool for correct location of the via.

In embodiments, there is a relationship between the injected viscosity of the conductive matrix material and the density and cover factor of the weave, whereby lower viscosity conductive matrices are used for fabrics having tighter weaves and/or higher cover factors. In addition, the clamping pressure of the clamp tubes and the seal of the clamp tube ends on the textile surface become more critical as the textile cover factor increases. The wetting thermodynamics of the matrix material is also important to matrix penetration. Higher surface energy fibers are easier to wet with a metal matrix, graphene matrix, or adhesive silver matrix system.

Metallic primers are used in some embodiments. The treatment of the surface with tin chloride or tin2 and/or another metallic primer in a liquid medium improves the wetting of the fiber surface by the matrix. As described below, an electroless plating primer is used in some embodiments to pre-treat the fibers of the fabric. Because the primary wetting and bonding of the matrix is to the conductors, the attachment of the matrix to the fiber surfaces is a secondary consideration, and is important mainly to the mechanical attachment of the via to the textile. The conductive bond between the matrix material and conductors is of primary importance.

In some embodiments where woven copper conductors include polymeric coating materials, the coating materials are melted and ablated by the heated matrix material as it is injected into the fabric. For example, a conductor formed from light copper "coil" wire can be coated by a low melt olefin polymer that will be removed when the heated matrix material is applied. The fiber cover for this type of conductor is also a factor.

Some embodiments with bonded conductors use TPU blends and/or olfactic blends that have low melting temperatures for bonding of the conductors to the textile. In some of these embodiments the matrix etches away the dielectric coating as it bonds to the conductive surfaces.

In embodiments with printed conductors, the conductive bond is to the printed material. In embodiments where binders are used with a conductive filler in the matrix, the via binder is compatible with the printed conductor. In some embodiments where graphene is used without a binder, the carrier is a wetting agent that ensures a clean conductive bond with the printed conductor.

Priming of Fabric Using an Electroless Plating Primer

When a metallic matrix material such as low temperature solder is to be used to form vias, the fibers of the fabric can be primed for enhanced adhesion to the matrix material using an electroless plating primer and pre-treatment process such as the primer and process disclosed in EP patent EP2698448, incorporated herein by reference in its entirety for all purposes.

Electroless plating is widely employed in various fields, including decorating application. Applications include imparting a luxurious and aesthetic appearance to a resin molded article, automotive parts, electromagnetic shielding, and wiring technology for printed circuit boards, and large scale integrated circuits. The reason is that electroless plating can produce a film with a uniform thickness regardless of the kind and shape of the substrate by simply immersing the substrate in a plating solution, and because electroless plating can produce metallic plating films on nonconductors such as plastic, ceramic, and glass.

Generally, when a metallic plating film is formed on a non-metallic substrate (an object to be plated) by electroless plating, a pretreatment or "priming" for electroless plating is carried out so as to increase adhesion between the underlying substrate and the metallic plating film. Specifically, the surface to be treated is roughened and/or hydrophilized by various etching means, followed by sensitization, wherein an adsorbing substance that promotes adsorption of a plating catalyst is provided on the surface to be treated, and activation, where the plating catalyst is allowed to adsorb on the surface to be treated.

Typically, sensitization involves immersion of the object to be treated in an acidic solution of stannous chloride to promote deposition of the metal ($Sn^{2+}$), which is capable of acting as a reducing agent on the surface to be treated. The sensitized surface to be treated is then immersed in an acidic solution of palladium chloride for activation. In this step, the palladium ion in the solution is reduced by the metal that is acting as a reducing agent (tin ion: $Sn^{2+}$) and deposited on the surface to be treated as an active palladium catalyst nucleus. After this pretreatment, the substrate is ready to be plated.

In embodiments, a pre-treatment or "priming" step similar or identical to the pre-treatment used for electroless plating is used to prepare the fibers of the fabric for enhanced bonding with a metallic matrix material such as low temperature solder.

Types of Vias

Figure 11:
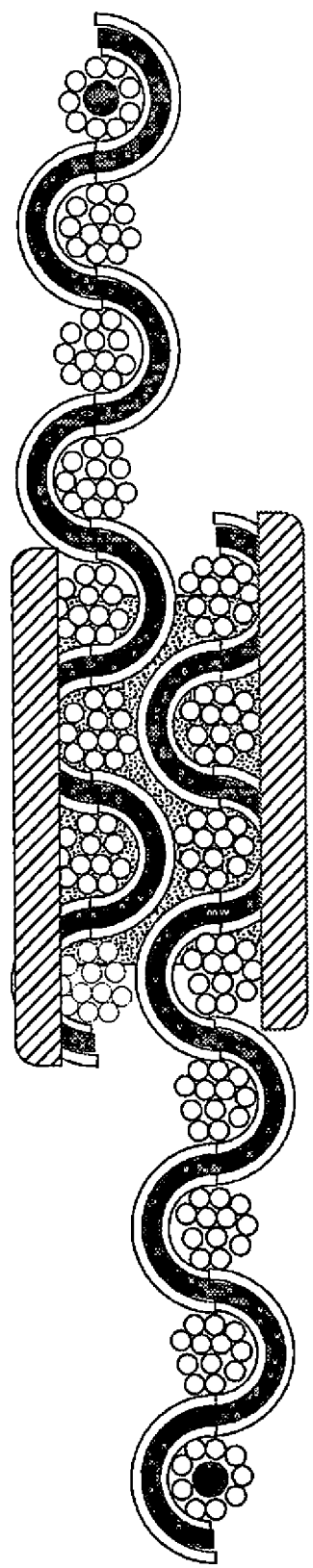
FIG. 11 is a cross sectional illustration of a via formed through a seam between e-fabric panels using an injected conductive matrix material in an embodiment of the invention.
Figure 12:
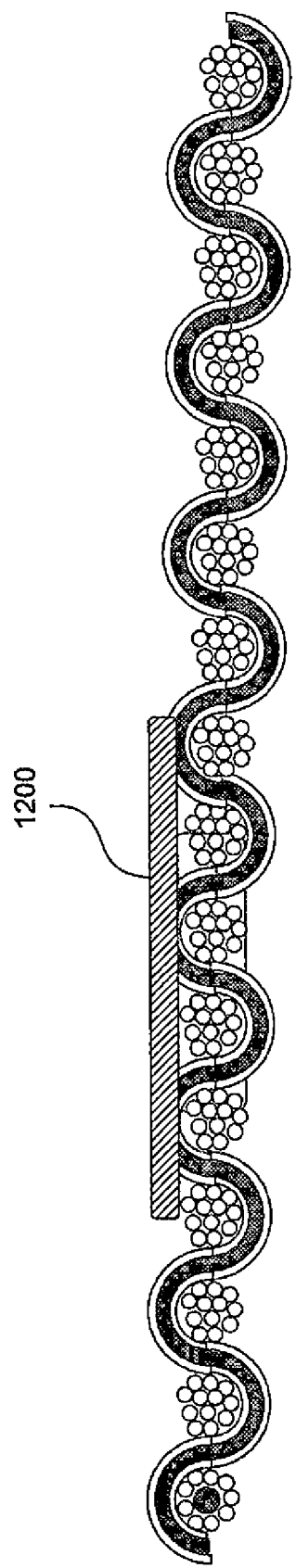
FIG. 12 is a cross-sectional illustration of a via that includes a connection pad according to an embodiment of the invention.

It will be clear to one of ordinary skill in the art that the via technology disclosed above can be applied to an e-fabric in various ways. For example, FIG. 11 illustrates a via formed as an across-seam interconnect between two fabric panels having conductors woven therein in both the warp and fill directions. FIG. 12 illustrates a via similar to FIG. 11, but including a connection pad-to-conductor interconnect 1200 for connection with external devices.

Figure 13A:
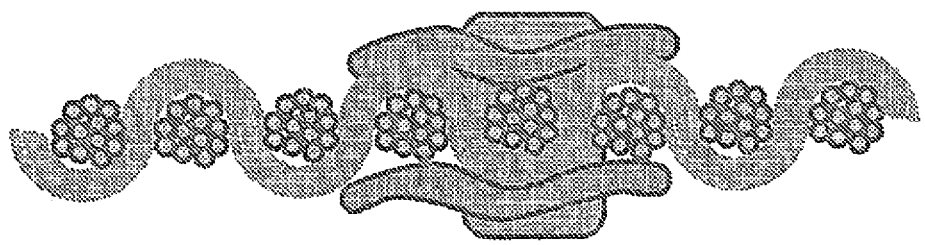
FIG. 13A is a cross-sectional illustration of a via that is formed between printed conductors of an e-fabric according to an embodiment of the invention.
Figure 13B:
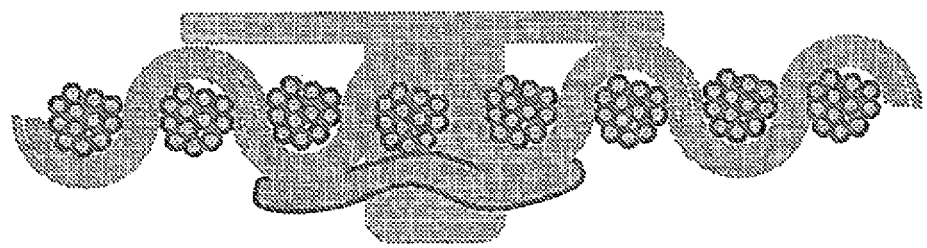
FIG. 13B is a cross-sectional illustration of a via that is formed between a printed conductor and a connection pad of an e-fabric according to an embodiment of the invention.
Figure 13C:
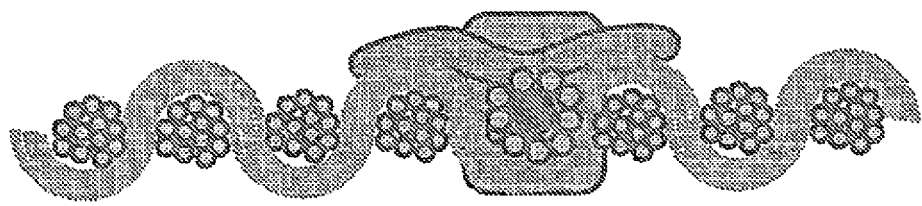
FIG. 13C is a cross-sectional illustration of a via that is formed between a printed conductor and a woven conductor of an e-fabric according to an embodiment of the invention.
Figure 13D:
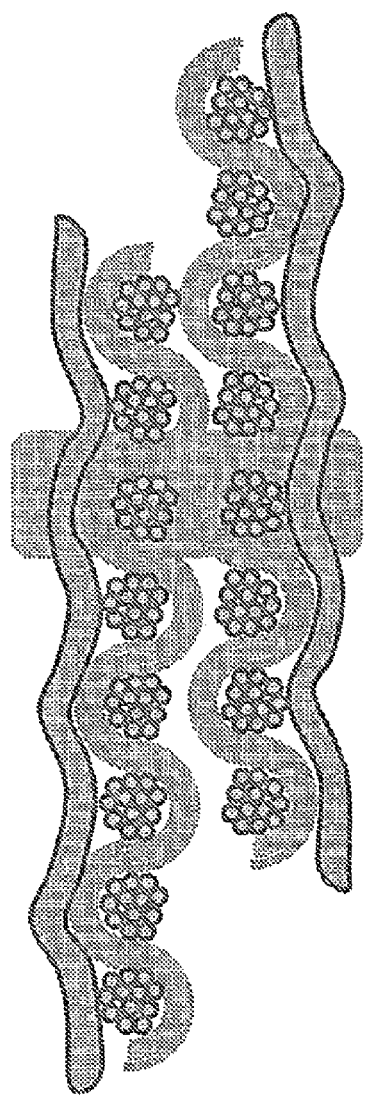
FIG. 13D is a cross-sectional illustration of a via that is formed between conductors across a seam in an e-fabric according to an embodiment of the invention.
Figure 13E:
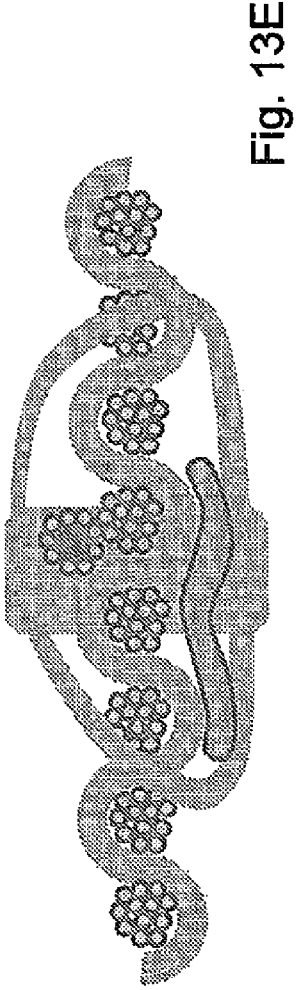
FIG. 13E is a cross-sectional illustration of a via that is formed between a printed conductor and an applique conductor of an e-fabric according to an embodiment of the invention.

FIGS. 13A-13E illustrate further examples of via-to-conductor interconnect configurations. The illustrated configurations are as follows:

FIG. 13A printed conductor to printed conductor with fabric via;

FIG. 13B printed conductor to connection pad with fabric via;

FIG. 13C printed conductor to woven conductor with fabric via;

FIG. 13D printed conductor to conductor across seam with fabric via;

FIG. 13E printed conductor to applique conductor with fabric via; and

FIGS. 14A and 14B are front and rear views respectively of a garment (a "hoodie," i.e. a knit jacket with integral hood) formed using e-fabric in an embodiment of the present invention. The garment includes 12 pair of discrete control points 1400, 4 pair of speaker jack connection points 1402, 2 pair of connections to LED controller buttons 1404, 1 pair of USB phone connections 1406, and 2 pair of connections for battery docking units 1408. The garment thereby includes 21 pairs or 42 contacts. Each contact includes connections to both the warp and fill conductors, resulting in a total of 82 conductor connections. Sixty connections are provided on seams (about 1.5 per contact), and 164 pad connections. A pouch 1410 is also provided for holding the phone while attached to the phone connections 1406 of the e-fabric.

According to the fourth general aspect of the present disclosure, the present invention is a flexible system for forming a plurality of electrical interconnections between an external electronic device and the conductors of an underlying e-fabric. The hoodie shown in FIGS. 14A and 14B is an example With reference to FIG. 15, one general aspect of the present invention includes a multi-contact, low density, flexible and compressible connecting pad 1500, referred to herein as a "soft connector" 1500, which comprises adjoining regions of conducting 1502 and dielectric 1504 elastomer arranged in alternating stripes, or in some other alternating pattern. In embodiments, the soft connector 1500 is attached to a backing sheet 1506, which in turn is attached to the e-fabric 1508 in a manner that compresses the soft connector 1500 against a plurality of connecting pads 1510 arranged in a compatible pattern on the underlying region of the e-fabric 1508. This arrangement forms a plurality of electrical interconnections distributed over a contact region of the interconnecting system that is flexible due to the bendable, elastomeric nature of the soft connector 1500.

In a second general aspect of the invention, the soft pad is flexible but not necessarily compressible, and is pressed against the connecting pads of the e-fabric by an inflatable bladder that is included between the soft connector and the backing sheet.

Figure 15:
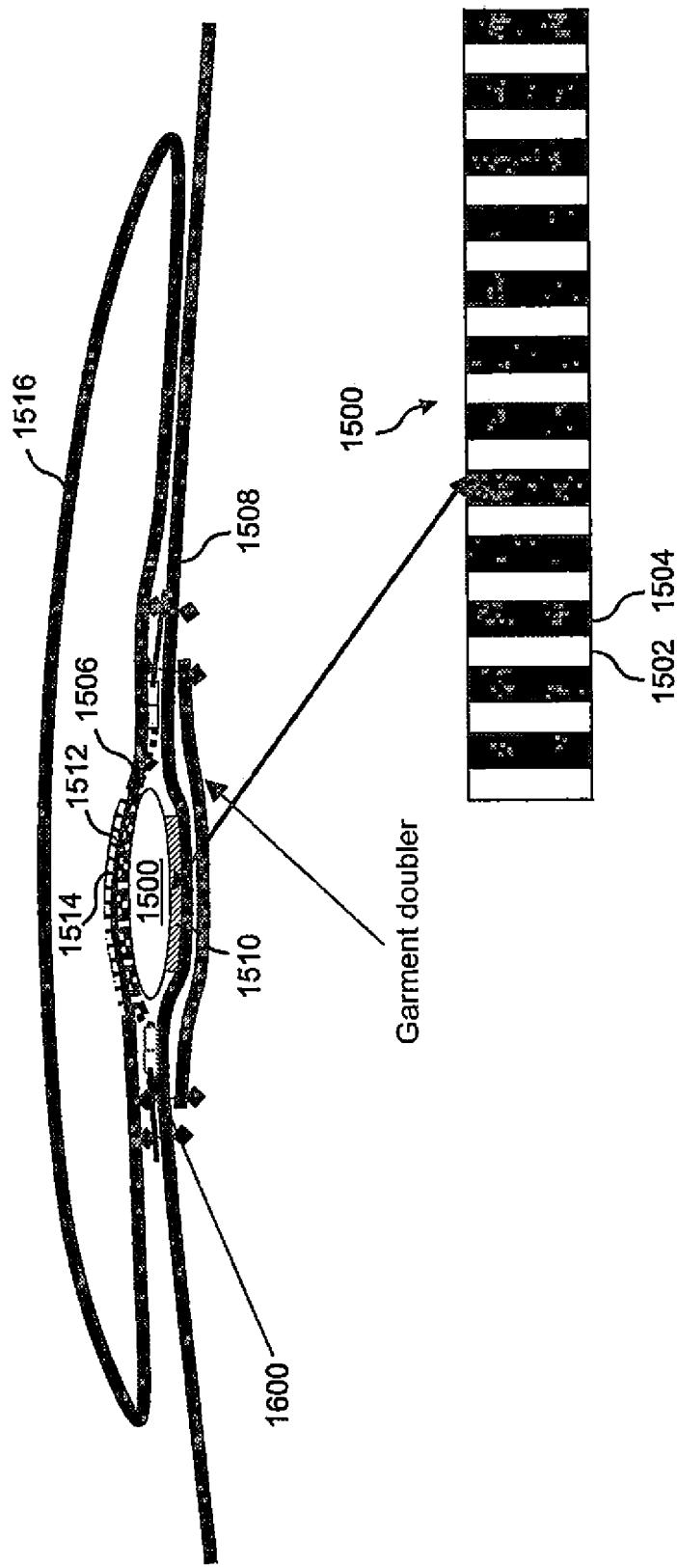
FIG. 15 is a cross-sectional illustration of a pouch and soft connector in an embodiment of the present invention.

In the embodiment of FIG. 15, the soft connector 1500 is attached to external connection points 1512 provided on an exterior surface of the backing sheet 1506, and the external contact points 1512 are connected by vias (1708 in FIG. 17, discussed below) with attachment locations 1514 on an interior surface of the backing sheet 1506. In other embodiments, at least one "window" is provided in the backing sheet so that an electronic device can be connected through the window directly to the rear surface of the soft connector.

Figure 16:
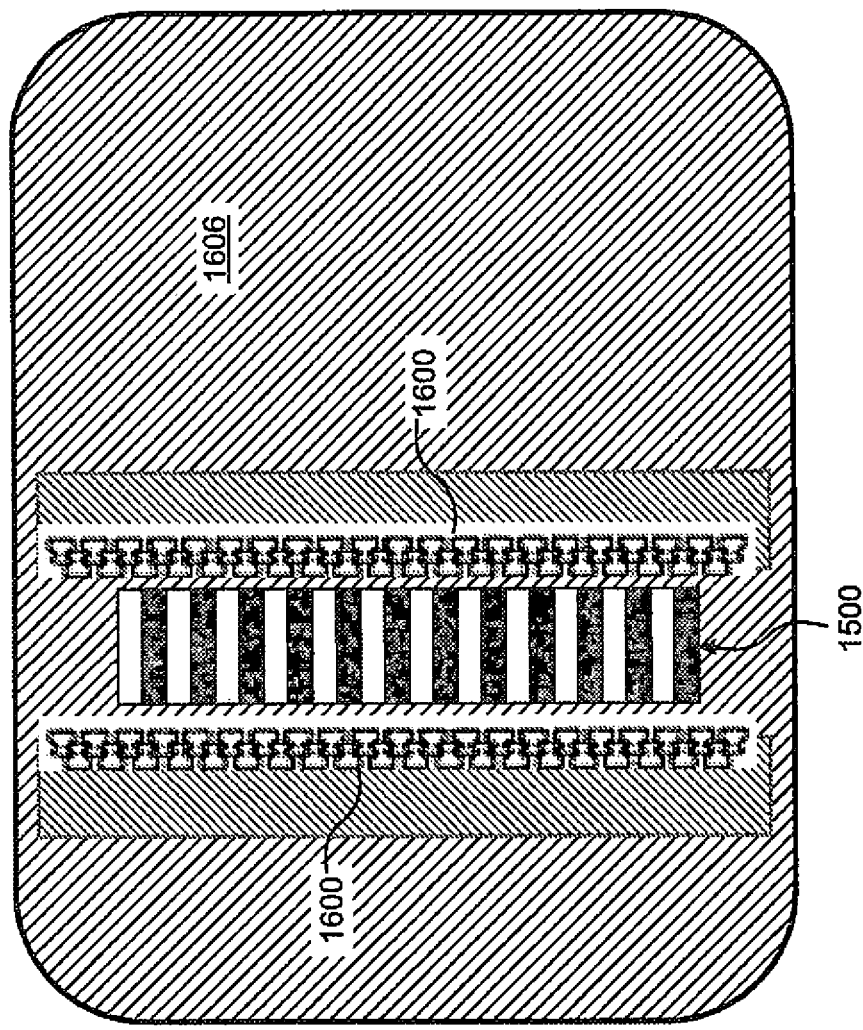
FIG. 16 is a bottom view of the pouch and soft connector of FIG. 15.

In the embodiment of FIG. 15, the backing sheet 1506 is part of a laminated pouch 1516 that surrounds and contains an electronic device (1700 in FIG. 17, discussed below). FIG. 16 presents a bottom view of the pouch 1516. As shown in the figure, the pouch 1516 includes a pair of zippers 1600 that attach the pouch to the e-fabric 1508, and also compress the soft connector 1500 against the connecting pads 1510 provided on the e-fabric beneath the backing sheet 1506. In similar embodiments, the backing sheet 1506 is attached to the e-fabric 1508 by snaps, laces, buttons, or some other means of attachment known in the art.

Figure 17:
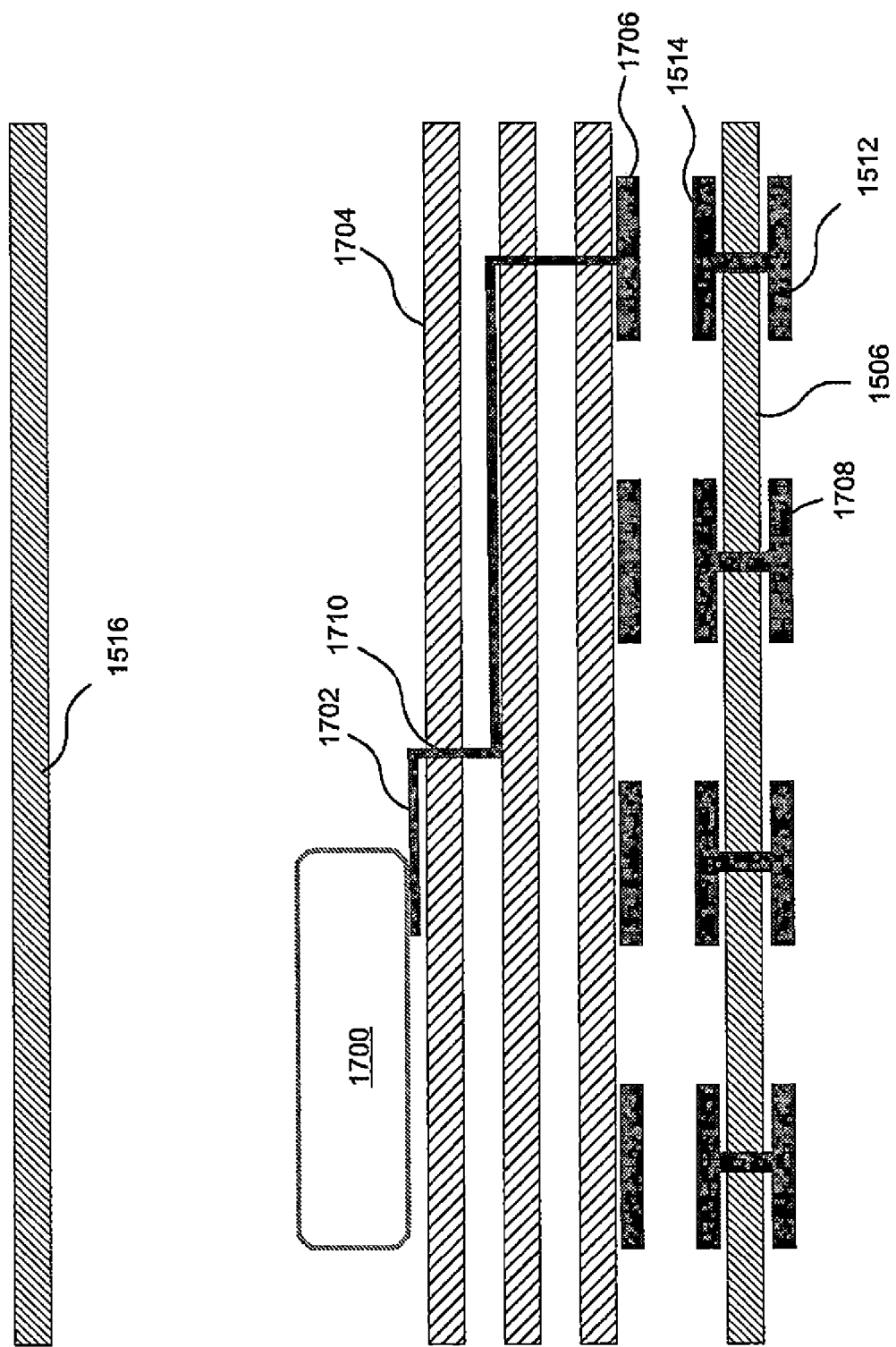
FIG. 17 is a cross sectional illustration of electrical interconnections between a device contained in a pouch and an e-fabric in an embodiment of the present invention.

FIG. 17 is a simplified cross sectional side view of the embodiment of FIGS. 15 and 16, showing the electronic device 1700 in a simplified form mounted on a conventional, rigid or semi-rigid multi-layer printed circuit board 1704 and connected to connection pads 1708 on the bottom of the board by conductors 1702 that are printed on the layers of the board 1704 and interconnected by vias 1710 that penetrate the circuit board 1704. In various embodiments, the connection pads 1706 are connected to the attachment locations 1514 of the backing sheet 1506 by low temperature solder, or by conductive adhesives (not shown).

In embodiments, the physical attachment of the backing sheet 1506 to the thermoplastic polyurethane ("TPU") circuit panel 1704, or other structural elements of the contained electronic device 1700 is further enhanced by a non-conductive adhesive that surrounds the contacts. In some embodiments, the vias 1708 that conduct the signals and power from the inner contact points 1514 through the backing sheet 1506 to the soft connector 1500 are fabric vias 1708. As noted above, in other embodiments a single window or a pattern of windows is provided in the backing sheet 1506 of the pouch 1516 so as to expose the interior of the pouch 1516 directly to the contacts on the soft connector 1500. In some of these embodiments, the electronic device 1700 is adhesively bonded to the backing sheet 1506 around these windows so as to form a hermetic seal.

In various embodiments, the pouch is hermetically sealed to protect the contents from water or rain. In various embodiments, the pouch is removable from the e-fabric so as to avoid flexing damage to copper traces of the traditional film and etched copper circuits and other elements of the contained the electronic device that may be damaged by wash and dry cycling of the e-fabric or e-garment even if the pouch is hermetically sealed.

As discussed above, in the embodiment of FIGS. 15 through 17, the backing sheet is part of a pocket or pouch 1516 that is configured for containing an electronic device 1700. In some embodiments, the pouch 1516 is a hermetic heat seal pouch 1516 made of flexible coated laminate fabric.

In embodiments, the pouch 1516 includes a water resistant and water vapor resistant barrier layer which is based on a laminated aluminum foil or metalized or non-metalized PET films. Furthermore, in some embodiments the inner and outer faces of the laminate pouch are layers of pigmented thermoplastic polyurethane that can be heat sealed for high strength hermetic bonds to permit assembly of the pouch.

This use of metallic layers, for example of silver or aluminum, in various embodiments for water permeation control is also effective for the shielding of EMI from active, high speed digital circuits contained in the pouch. For pouches which contain wireless devices, antennas can be located on the outer pouch surface outside of the EMI shielding. A ground plane can also be included in the pouch as part of the antenna configuration.

Following are examples of the layers that are included in the pouch laminate in various embodiments:

Example #1

Pigmented polyether TPU, 3 mils
Metal to TPU Primer
CVD metalized PET film, 1 mil
Metal to TPU Primer
Polyether TPU, 2 mils 220 denier 50×50 High tenacity PET (poly-ethylene terephthalate) woven
Polyether TPU 2 mils Example #2

Pigmented polyether TPU 3 mils
Antenna traces
Metal to TPU Primer
Aluminum foil 2 mils
Metal to TPU Primer
Polyether TPU 2 mils
1000 denier 31×31 Para Aramid woven
Polyether TPU 2 mils Example #3

Contact pads for connector
Pigmented polyether TPU 3 mils
Metal to TPU Primer
CVD metalized PET film 1 mil
Metal to TPU Primer
Polyether TPU 2 mils
220 denier 50×50 High tenacity PET woven
Polyether TPU 2 mils
Copper contact traces for connection to inner circuit According to the fifth general aspect of the present disclosure, the present invention is an e-fabric and a method of production thereof, wherein conductors are heat sealed to an underlying fabric or garment by a ribbon of thermoplastic polyurethane.

The disclosed e-fabrics include conductors that are heat-sealed onto the fabric. With reference to FIG. 18, in some embodiments, the conductors are either bare copper or insulated by a thin polymer coating, and can be either round 1800 or flat 1802. In other embodiments the conductors are fiber wrapped 1804. Embodiments having round conductors 1800, 1804 are used in some cases for routing around corners. Some stretch fabric embodiments include crimped and/or zigzag patterned copper conductors (see FIGS. 21C and 21D, described in more detail below) sealed to the fabric layer by high stretch TPU tape.

Figure 19A:
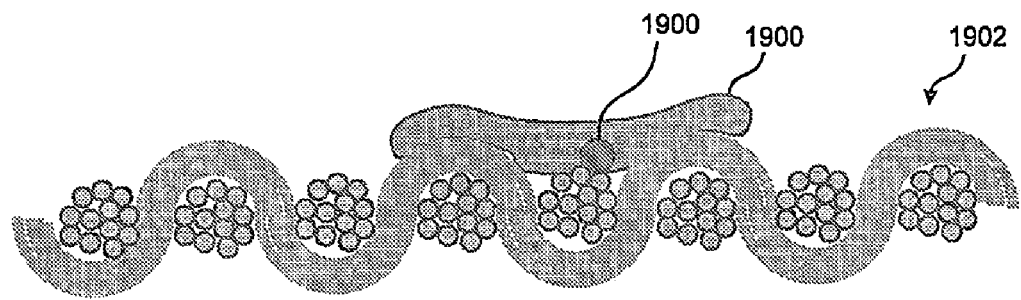
FIG. 19A is a cross sectional illustration of an embodiment that incorporates a bare copper conductor.
Figure 19B:
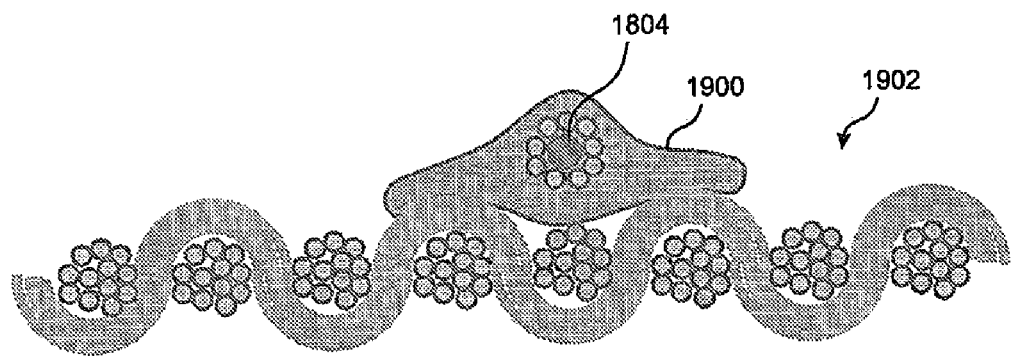
FIG. 19B is a cross sectional illustration of an embodiment that incorporates a fiber covered copper conductor.

With reference to FIGS. 19A and 19B, disclosed methods for heat-sealing conductors 1800, 1804 to an e-fabric 1902 include applying hot air to a ribbon of thermal polyurethane ("TPU") 1900. "Plotter-cutter" equipment can be used for larger scale manufacturing applications.

According to the present invention, conductors are applied to fabric after the fabric is manufactured, and in embodiments the conductors are applied to a garment after the garment is manufactured. The result is a simple and flexible method of producing e-fabric garments that provides for a rational and linear manufacturing flow. In embodiments, the garments are produced with specified fabrics and seaming in a single work cell, while traditional high density circuits are produced in a second work cell. Integration of the garment with the high density circuits is then completed in a third work cell through implementation of the present invention, as is made possible by the novel conductors and application method of the invention.

Figure 20B:
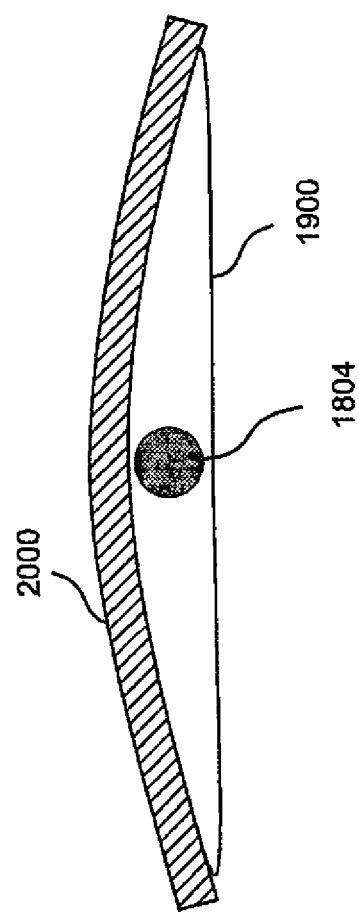
FIG. 20B is a cross sectional illustration of an embodiment that includes a copper conductor embedded within a TPU adhesive, applied with a textile tape cover.
Figure 20A:
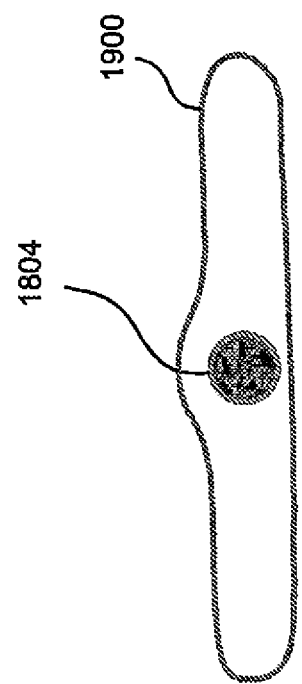
FIG. 20A is a cross sectional illustration of an embodiment that includes a copper conductor embedded within a TPU adhesive, applied without a textile tape cover.

According to embodiments of the present invention, conductors that convey power and signals from garment controllers to sensors, actuators, and other devices included in the e-garment, are required to traverse garment panels and seams. The bonded conductor design of the present invention permits the application of the conductors to the finished garment in a manner that presents a smooth, finished garment appearance. With reference to FIGS. 20A and 20B, in some embodiments (FIG. 20B) where the garment is not lined, textile cover tapes 2000 can be used in combination with a bonding adhesive 1900, so that the conductors 1804 are located beneath the textile tapes 2000. In other embodiments (FIG. 20A) a cover tape 2000 is not included.

Stretchable Bonded Conductors

Figure 21A:
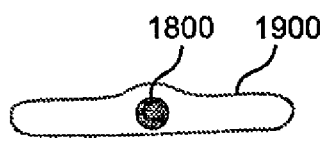
FIGS. 21A through 21D are cross-sectional (21A and 21C) and top views (21B and 21D) of embodiments that include straight (21A and 21B) and zigzag (21C and 21D) conductors.
Figure 21C:
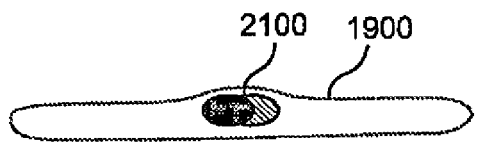
Figure 21B:
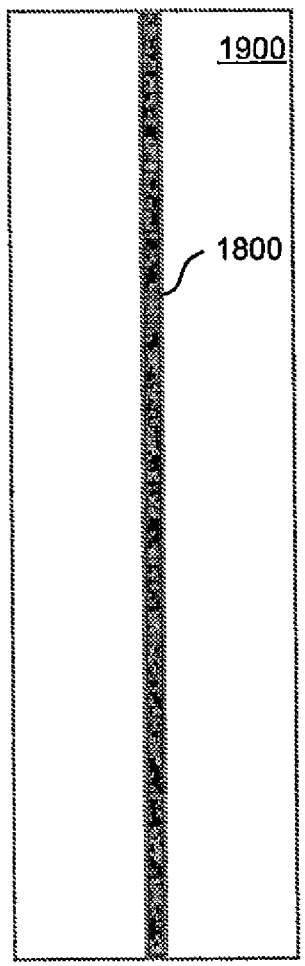
Figure 21D:
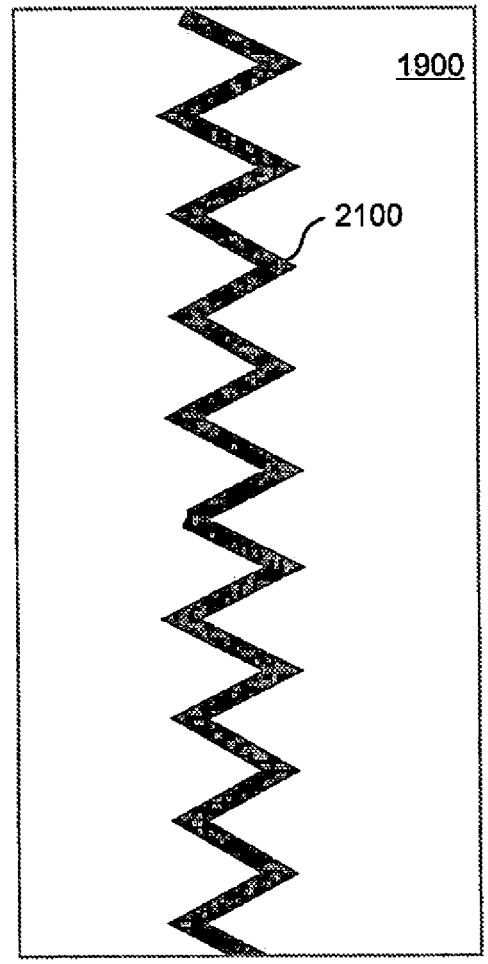

With reference to FIGS. 21A and 21B, in embodiments where the fabric is not stretchable, the conductors 1800 are typically straight, except where they bend around corners etc. On the other hand, with reference to FIGS. 21C and 21D, in various embodiments where a stretchable e-fabric is required, conductors are applied with a crimped or zigzag pattern 2100, and are bonded to the fabric by stretchable adhesives such as thermoplastic urethanes or polyurethanes (TPU's) 1900. If a textile cover tape 2000 is included, a stretchable textile is used. The stretchable cover tape 2000 can be a straight or bias-cut stretch woven or knit, and can be made from any fabric yarn type and dyed to match a fabric or garment panel. In embodiments, the stretchable cover tape 2000 includes cotton, lyocel, PET, and/or nylon fibers. The stretch capability of the cover tape 2000 can be due to intrinsic properties of crimped fibers, which can be urethane fiber blends.

Stretch fabrics and garments are designed to accommodate a specified maximum percentage of stretch, which is typically less than 50%. The stretch capability of conductors 2100 applied in embodiments to such fabrics and garments is matched to the stretch range of the underlying fabric 1902, such that they meet but do not significantly exceed the stretch capability of the fabric 1902. Since the disclosed bonded conductors are laminated structures, there is an increase of the garment modulus in the area of each bonded conductor. This modulus is increased as the maximum stretch of the conductor, i.e. the degree of crimping or zigzagging, is increased. In embodiments it is desirable to minimize this increase in modulus, and hence to provide only sufficient crimping or zigzagging of the conductor to accommodate the stretch of the fabric.

When a copper conductor is applied in a zigzag pattern 2100 with a covering tape 2000, "necking" occurs as the covering tape 2000 is forced to accommodate the narrowing of the width of the conductor pattern 2100 as it is stretched. Otherwise, the covering tape 2000 can restrict the maximum stretch and thereby increases the stretch modulus. Embodiments use elastomeric conductors without textile covers so as to avoid this necking limitation, thereby increasing the maximum elongation of the conductor.

With reference to FIGS. 22A and 22B, other embodiments include conductors that are formed as helically wound coils 2200 or crimped conductors 2202. In some of these embodiments, the helical conductors 2200 are bonded to the TPU ribbon 1900 over only part of each turn of the coil. In various of these embodiments, the helical configuration of the conductor 2200 is provided within a thin dielectric cover that completely covers the conductor even where the conductor 2200 is not fully covered by the bond adhesive 1900 or a textile tape 2000.

Configurations of Bonded Conductors

Figure 23:
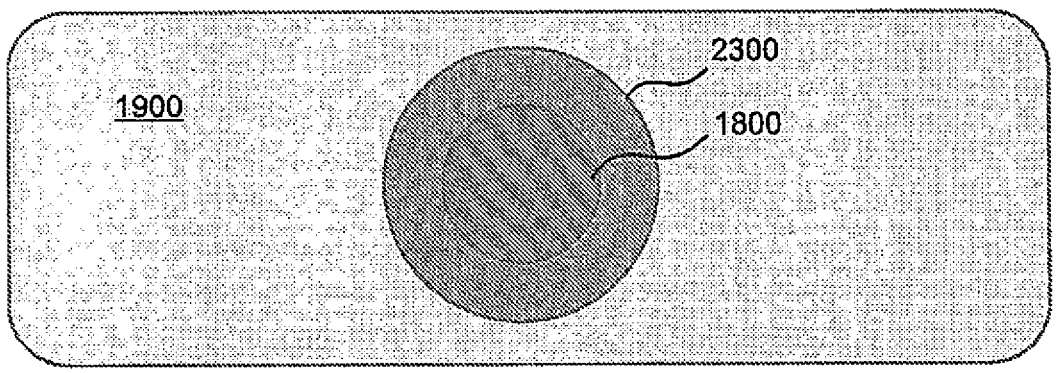
FIG. 23 is a cross sectional illustration of an embodiment that includes a conductor having a high temperature secondary polymeric coating.
Figure 24:
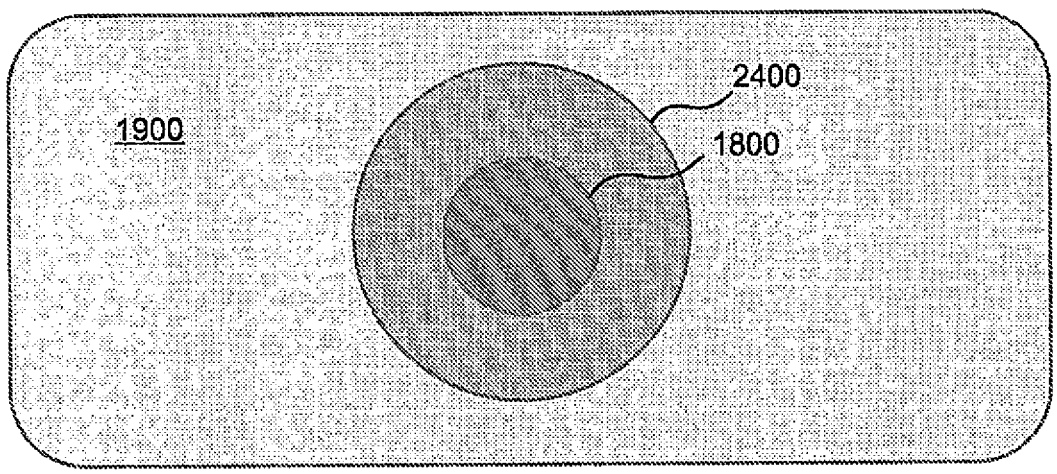
FIG. 24 is a cross sectional illustration of an embodiment that includes a conductor having a soft secondary coating.
Figure 25A:
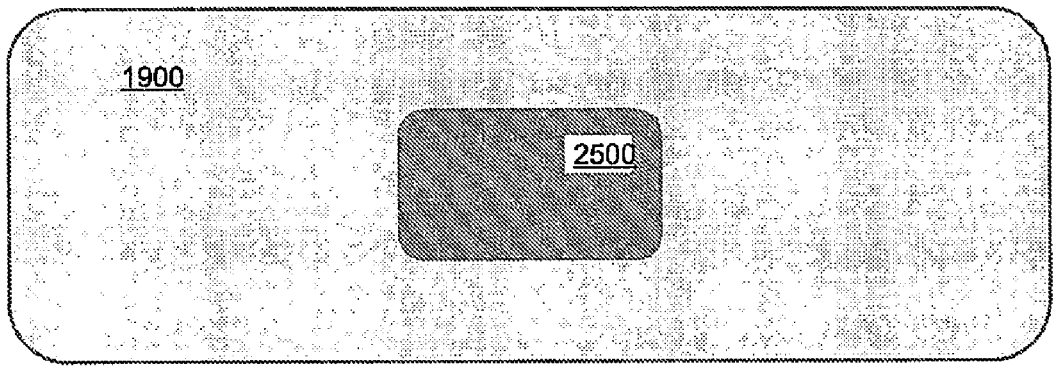
FIG. 25A is a cross-sectional illustration of an embodiment in which the conductor is a binder having a conductive filler.
Figure 25B:
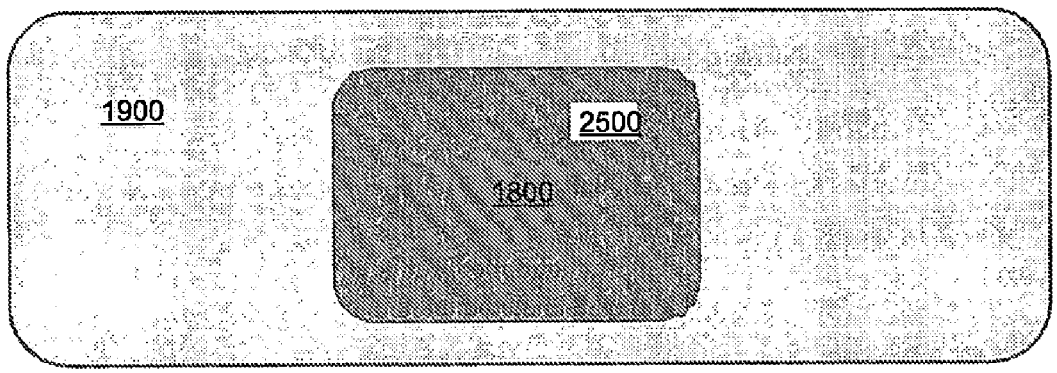
FIG. 25B is a cross-sectional illustration of an embodiment in which a copper conductor is surrounded by a binder having a conductive filler.

Configurations of the bonded conductors used for garments or other textile configurations in various embodiments include:
  simple conductors in thermoplastic ribbons (FIG. 20A);
  simple conductors in thermoplastic ribbons covered by textile cover tapes (FIG. 20B)

configurations such as those above including crimped, zigzag (FIG. 21D, item 2100), or helical conductors (FIG. 22A, item 2200) that are compatible with stretch fabrics;

with high temperature secondary polymeric coatings (FIG. 23, item 2300) for improved dielectric performance;

conductors with softer secondary coatings (FIG. 24, item 2400) to control work hardening due to bending;

conductors fabricated of polymers filled with conductive fillers (FIG. 25A, item 2500), so that work hardening in high flex applications is avoided;

metallic conductors 1800 embedded in conductive polymeric coatings 2500 that reduce the occurrence of open circuits from work hardened conductors in applications where high current flow and high flex are both needed; and As shown in FIG. 26, conductor assemblies having either one or a plurality of conductors attached by a single ribbon of TPU, applied with or without covering fabric tape.

Conductor Production

The production of conductors in embodiments can be compared to the manufacture of cables. The conductors are prepared with sheath coatings as required. Then, the conductor pattern is threaded in guides. For some embodiments where the conductors are simple and do not require cover tape, each conductor is sandwiched between two layers of thermoplastic adhesive film. In various embodiments, the adhesive film is a polyester or polyether blown thermoplastic urethane. The film thickness is related to the conductor dimensions. For example, in embodiments a 38 gauge round conductor of 0.004 inch diameter is sandwiched between TPU films having a thickness of at least 0.0045 inches, but not more than 50% of the conductor radius. This ratio of conductor thickness to adhesive thickness provides for good encapsulation of the conductor. In some embodiments that include a textile cover tape, the top layer of adhesive film is applied to the textile and then the conductors are attached, followed by the bottom layer of adhesive film. Similar configurations can also be achieved by direct extrusion of the conductors in a tape-shaped extrusion die.

Alignment of Conductors with Thermoplastic Tape

Figure 27:
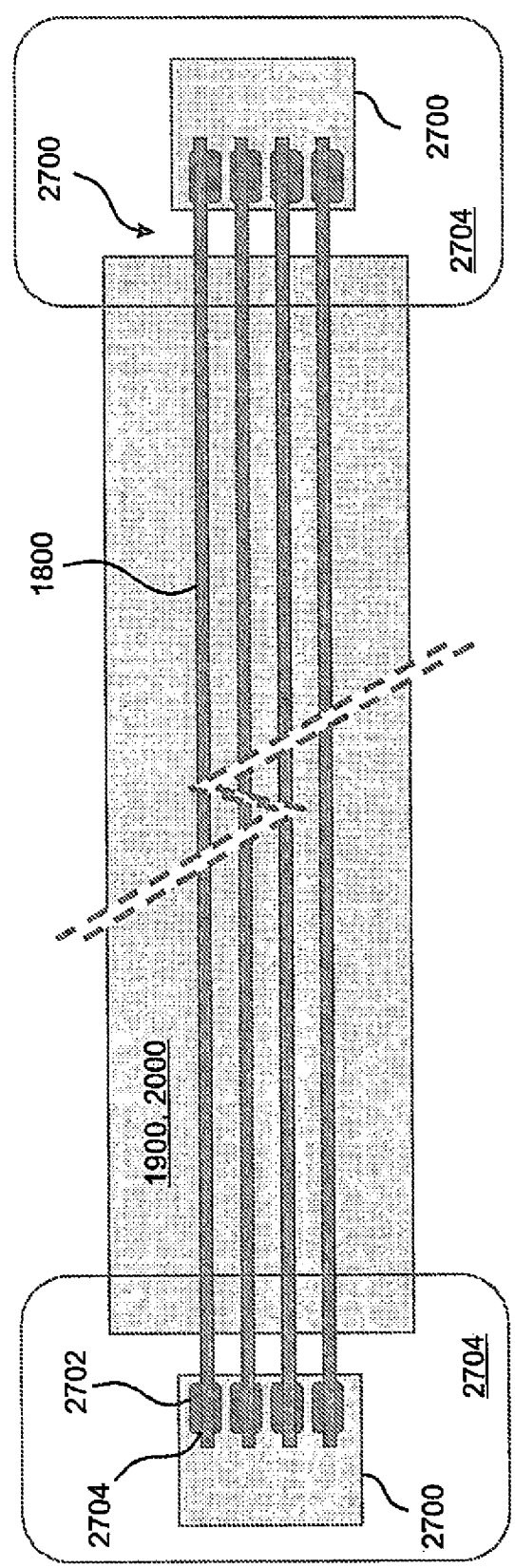
FIG. 27 is a top view of an end-to-end multi-conductor interconnecting assembly in an embodiment.

FIG. 27 illustrates an end-to-end interconnecting system in an embodiment of the invention. At each end of the connection a flexible interconnecting region 2700 of the fabric is provided with a plurality of attachment pads 2702 that are bonded to the fabric 2700 by solder or by a conducting adhesive 2704, and protected by a bonded cover patch. The pads 2702 are connected by vias (not shown) to the plurality of conductors 1800 that are bonded as a group by adhesive 1900 and covering tape 2000 to the underlying fabric.

In various embodiments such as FIG. 27 that include a covering tape 2000, the adhesive 1900 and covering tape 2000 must be removed at each end 2700 for termination of the conductors 1800 and their connection to high density circuits, connection pads 2702, and other devices. In some of these embodiments, such as the embodiment of FIG. 27, precise alignment of the conductors 1800 with the tape 2000 facilitates application of the required mechanical and thermal cutting and trimming tools.

Conductor Vias

Figure 28A:
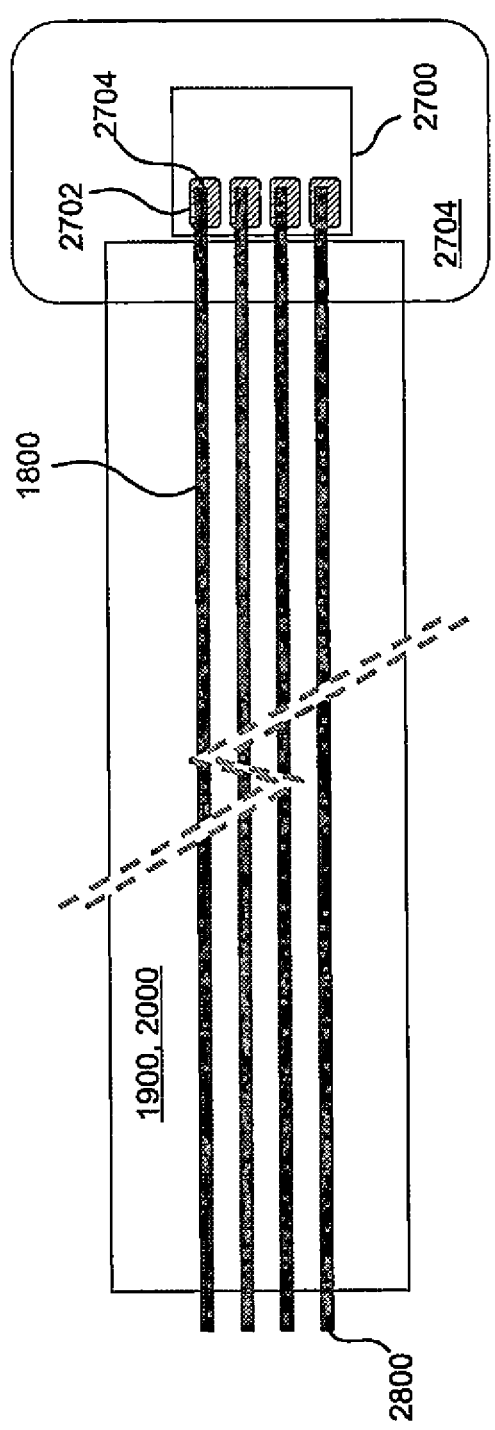
FIG. 28A is a top view of an end-to-end interconnecting assembly in an embodiment that includes vias connecting a plurality of conductors at one end to connection pads on an opposing fabric side at the other end.
Figure 28B:
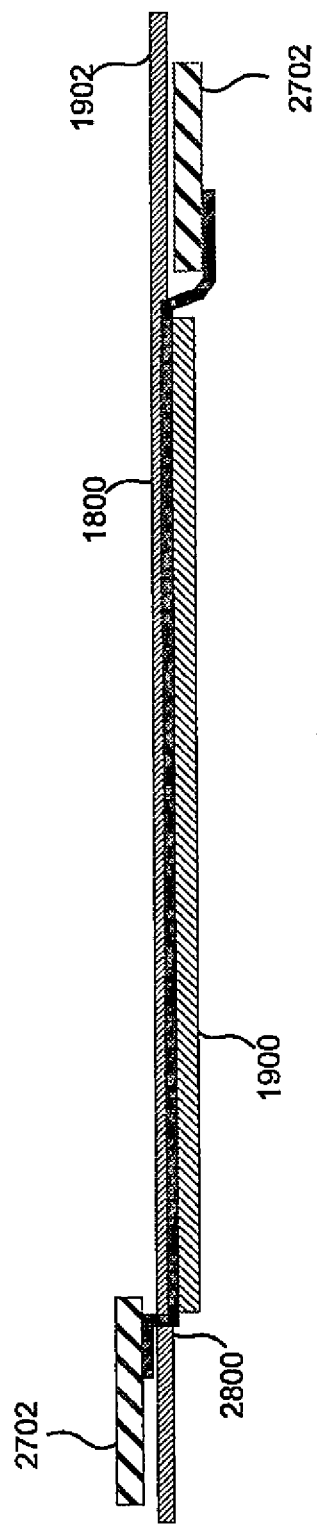
FIG. 28B is a side view of the end-to-end interconnecting assembly of FIG. 28A.

With reference to FIGS. 28A and 28B, vias 2800 are provided in various embodiments that penetrate the textile 1902 and form electrical contacts between conductors 1800 applied on the opposite sides of the textile 1902, and/or between conductors 1800 and connection pads 2702, high density circuits, sensors, switches, and/or other devices. Embodiments include vias 2800 formed according to the disclosure presented above. The use of these novel conductor vias 2800 eliminates secondary connections that are otherwise associated with fabric vias.

FIG. 28A is a view from above of an end-to-end flexible interconnecting system similar to FIG. 27, except that the termination pads 2702 on the left side are below the fabric 1902 and are connected by stitched connector vias 2800 to the conductors 1800. FIG. 28B is a view from the side of the end-to-end interconnecting system of FIG. 28A.

Figure 29:
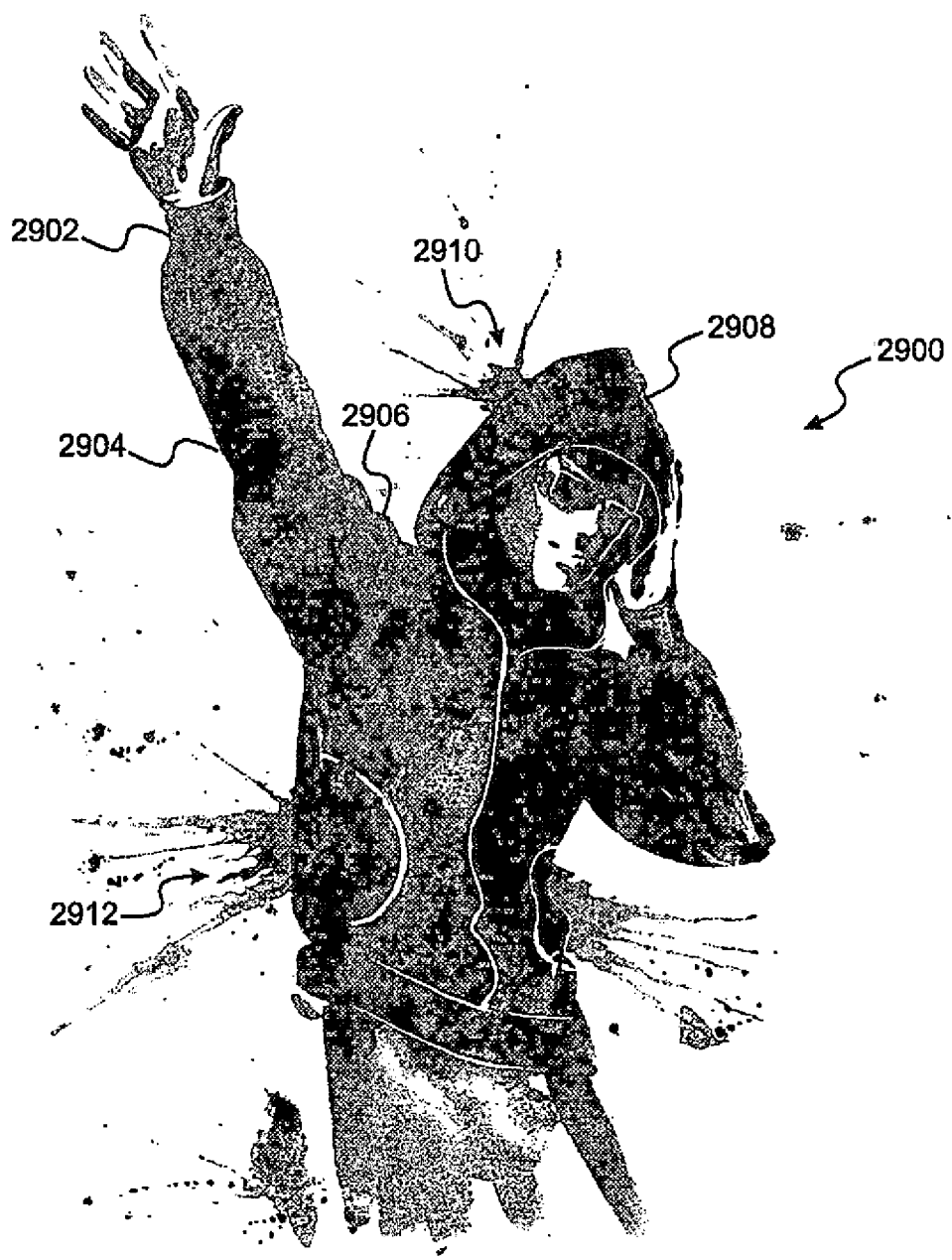
FIG. 29 is perspective view of a user wearing an embodiment of the present invention that is able to simultaneously control multiple aspects of an audiovisual presentation in real time.

According to the sixth general aspect, with reference to FIG. 29, the present invention is a garment 2900 into which are incorporated at least one of position, orientation, flexion, and acceleration sensors. According to the embodiment, various sensors are incorporated in the garment 2900 at locations on the extremities, such as near the wrists 2902, at joints such as the elbows 2904, and/or at the shoulders 2906 or head 2908. In embodiments, the sensors include piezo thin film laminate sensors, and in various embodiments piezo fiber strain measurements are provided at joints of the garment.

In various embodiments the sensors are able to determine, for example, a rate at which an arm or leg of the garment is being extended, rotated, or otherwise moved, and/or a position and/or direction in which the hood is moved or oriented, as well as positions and movements of the garment shoulders and other parts of the garment. Physical contact between the sensors and the user's body is not required, because the sensors detect positions, orientations, and movements of various parts of the garment, rather than sensing the user's body directly.

In embodiments, a user is thereby able to spontaneously control multiple aspects of an audiovisual presentation in real time by making large and/or small gesture movements. Embodiments further include finger-operated controls such as buttons and or slider controls, for example on a panel provided on a sleeve or on a chest area of the garment (not shown). Embodiments of the garment thereby provide both manual and "gesture" control over various audiovisual effects, thereby further expanding the ability of the user to spontaneously control a large number of audiovisual effects in real time.

In the embodiment of FIG. 29, the garment 2900 is a so-called "hoodie," being a knit jacket that includes an integral hood. In the embodiment of FIG. 29, the garment 2900 further includes speakers or other sound-producing devices in the hood 2910 for use when relatively private enjoyment of music is desired, and/or to provide direct and controllable feedback regarding all or possibly just certain aspects of performed music while in a noisy environment. The embodiment of FIG. 29 further includes speakers 2912 or other sound-producing devices that can provide musical output in the immediate vicinity of the garment 2900, for example to provide a musical presentation in the immediate vicinity of the user without need of any external devices. Various embodiments include piezo flat panel speakers, and/or low profile cone-type speakers as sound-emitting devices. Embodiments further include Bluetooth or other wireless communication that enables the garment to control sound, light, pyrotechnics, and other audiovisual output emitted from external speakers and/or other external devices.

Embodiments further include a battery incorporated for example in a chest or rear panel of the garment that provides primary and/or auxiliary power to sensors, speakers, wireless devices, and/or other garment-incorporated devices.

Control over an audiovisual presentation can be realized in various embodiments by large, expansive gestures, and/or by smaller arm, neck, and shoulder gestures. Embodiments include a so-called "DJ" mode, whereby the garment is able to control at least two tracks of digitally recorded music to create effects such as blending, mashups, and fades. In embodiments, the volume and tracks can be controlled for all speakers in the system, as well as cue tracks, loop and add effects, and cross fade lean left to right. For example, acoustic volumes and other effects presented by speakers and other devices located on the user's right can be controlled by movements of the right side of the user's body, e.g. of the user's right arm and leg, and similarly devices on the left side of the user can be controlled by the left side of the user's body.

In various embodiments, the disclosed garment system provides a platform for development of applications and effects by hardware and software developers and musicians. Embodiments support MIDI and other well established standards for digital music creation and control, and some embodiments provide plug-ins for existing DJ and digital music composition and performance platforms Embodiments further include optical display features integrated into the garment, using for example woven light pipes of grouped lengths and/or pixilated control of fiber optics incorporated into the garment. These optical features can be used, for example, to display a beat trace or other optical effects that corresponds with or complement the music being performed.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

This specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

I claim:

1. A method for forming interconnections between electronic devices embedded in textile fibers, the method comprising:
    using a weaving machine to weave a textile panel from textile fibers, at least one of said fibers being a smart fiber that includes an electronic device embedded in a central portion thereof and at least one electrically conducting filament proximal to an outer boundary thereof;
    while the textile panel is in the weaving machine, creating a plurality of fiducials in the textile fibers of the textile panel, said fiducials being non-visible to the human eye, said fiducials being correlated in location with said at least one smart fiber;
    after removal of the textile panel from the weaving machine, using machine vision to locate said fiducials and thereby to map distortions of a pattern of the electrically conducting filaments, said machine vision being capable of detecting IR phosphors and/or other markers;
    transforming an interconnect pattern so that the interconnect pattern matches the distorted pattern of conducting filaments in the textile; and
    applying the transformed interconnect pattern to the textile panel so as to form an electrical connection with the electronic device.

2. The method of claim 1, wherein the fiducials include infra-red phosphors.

3. The method of claim 1, wherein the fiducials are woven into a grid square having a crossing point spacing that permits location of at least one internal feature in the grid square.

4. The method of claim 1, wherein the method further comprises:
    bonding the textile panel to a substrate while the textile panel is on a sand roll of the weaving machine;
    performing a wet scour of the textile fibers in the textile panel;
    forming the electrical connection with the electronic component; and
    removing the substrate from the textile panel.

5. The method of claim 4, wherein the substrate is a polyethylene terephthalate (PET) film.

6. The method of claim 5, wherein the PET film has a thickness of between 6 mil and 15 mil.

7. The method of claim 1, further comprising forming at least one via in said smart fiber, said via providing electrical access to said conducting filament.

8. The method of claim 7, wherein the via is formed by application of an etching method to remove a masking material on said smart fiber so as to expose said conducting filament.

9. The method of claim 8, wherein said etching method is a chemically induced laser etching method.

10. The method of claim 8, wherein said textile panel includes a plurality of smart fibers having electrodes masked by a plurality of selected masking materials that are respectively matched to a plurality of etching methods, thereby allowing said electrodes to be selectively exposed by application of a corresponding selection from among said etching methods.

11. The method of claim 10, wherein at least one of the etching methods is a chemical etching method that is matched to a solubility of said corresponding masking material.

12. The method of claim 10, wherein at least one of the etching methods is a laser-enhanced chemical etching method that is matched in wavelength to a wavelength coupling of said corresponding masking material.

13. The method of claim 8, wherein the masking material is applied to the smart fiber using an inkjet printing process.

14. The method of claim 8, wherein a photoresist is applied to the textile panel, after which wet etching is applied to the textile panel.

15. The method of claim 14, wherein the steps of applying a photoresist and wet etching are repeated so as to apply a plurality of conductor sets to the textile panel.

16. The method of claim 1, wherein the textile panel includes a plurality of smart fibers having exposed vias, and wherein applying the transformed interconnect pattern includes forming at least one electrical connection between two of said smart fibers by using ink jet printing with a conductive ink.

17. The method of claim 1, wherein an ink jet printing process is used to cover at least a portion of the interconnect pattern with a protective coating so as to maintain a wash compatibility of the textile panel.

18. The method of claim 1, further comprising preparing two textile panels according to the method of claim 1, wherein the interconnect patterns of the textile panels have connecting paths that extend to exposed connecting pads located on respective edges of said textile panels, and the method further includes aligning said connecting pads of said panel edges and sewing together said edges so as to form a seam between said textile panels.

19. The method of claim 18, wherein the method further includes attaching together said respective edges of said textile panels using an electrically conductive adhesive.

20. The method of claim 1, wherein said interconnect pattern includes connecting paths that extend to exposed connecting pads to which electrical connections from devices exterior to said textile panel can be formed.

21. The method of claim 1, wherein said interconnecting pattern is integrated with a visible pattern applied to said textile panel.

\* \* \* \* \*